INVENTOR.
Harold A. McMaster
BY
Barnard, McGlynn & Reising
ATTORNEYS

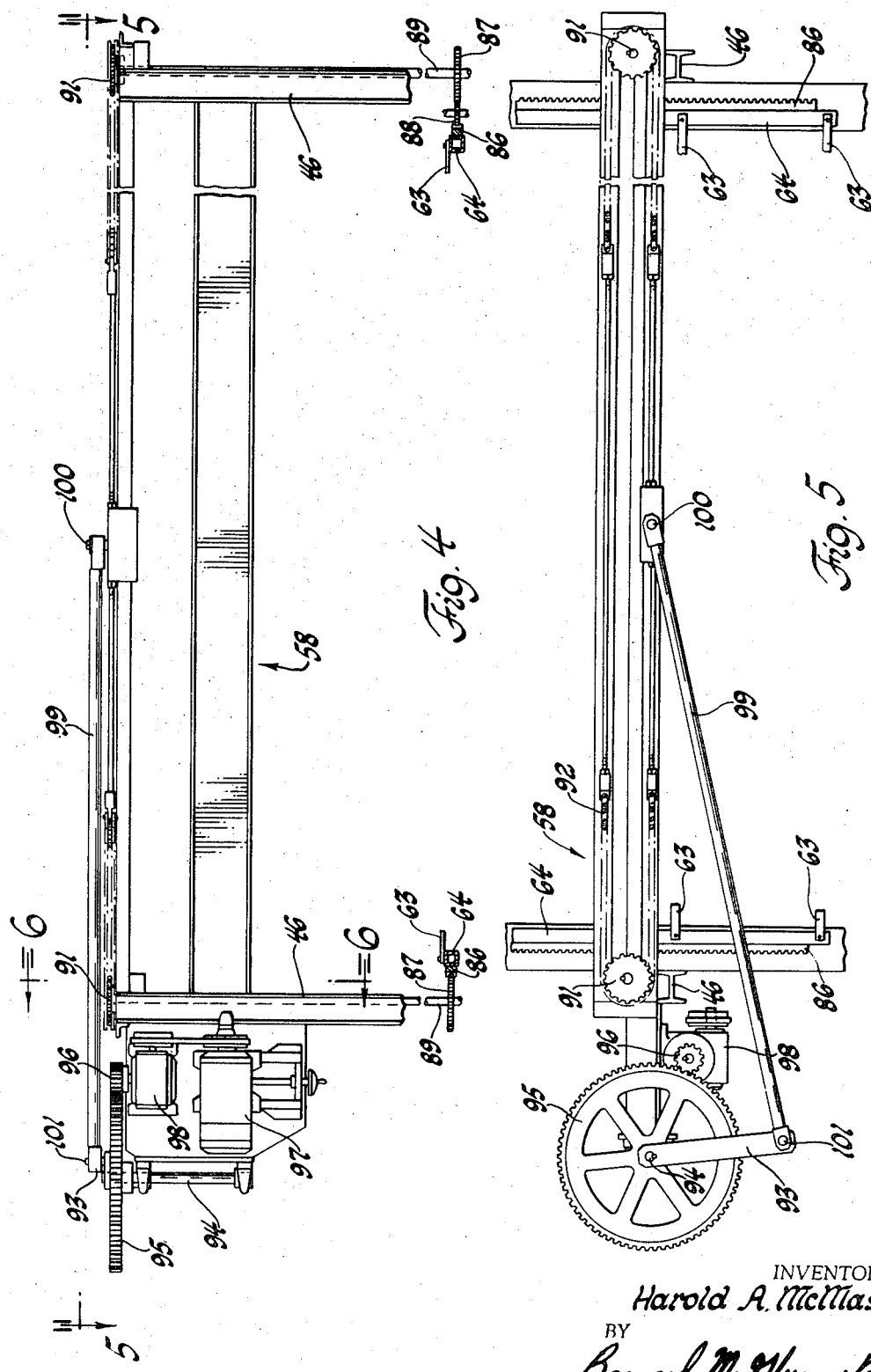

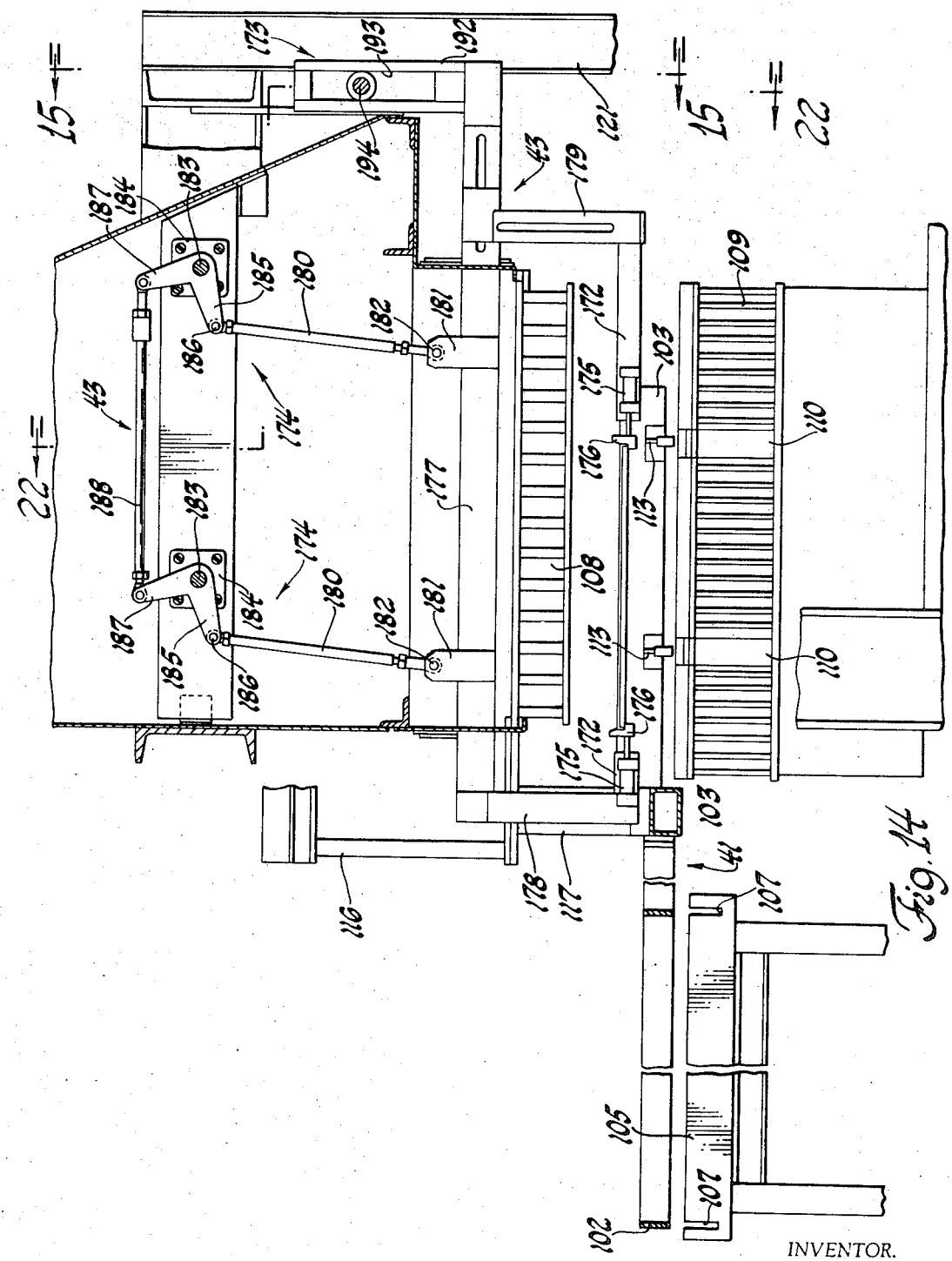

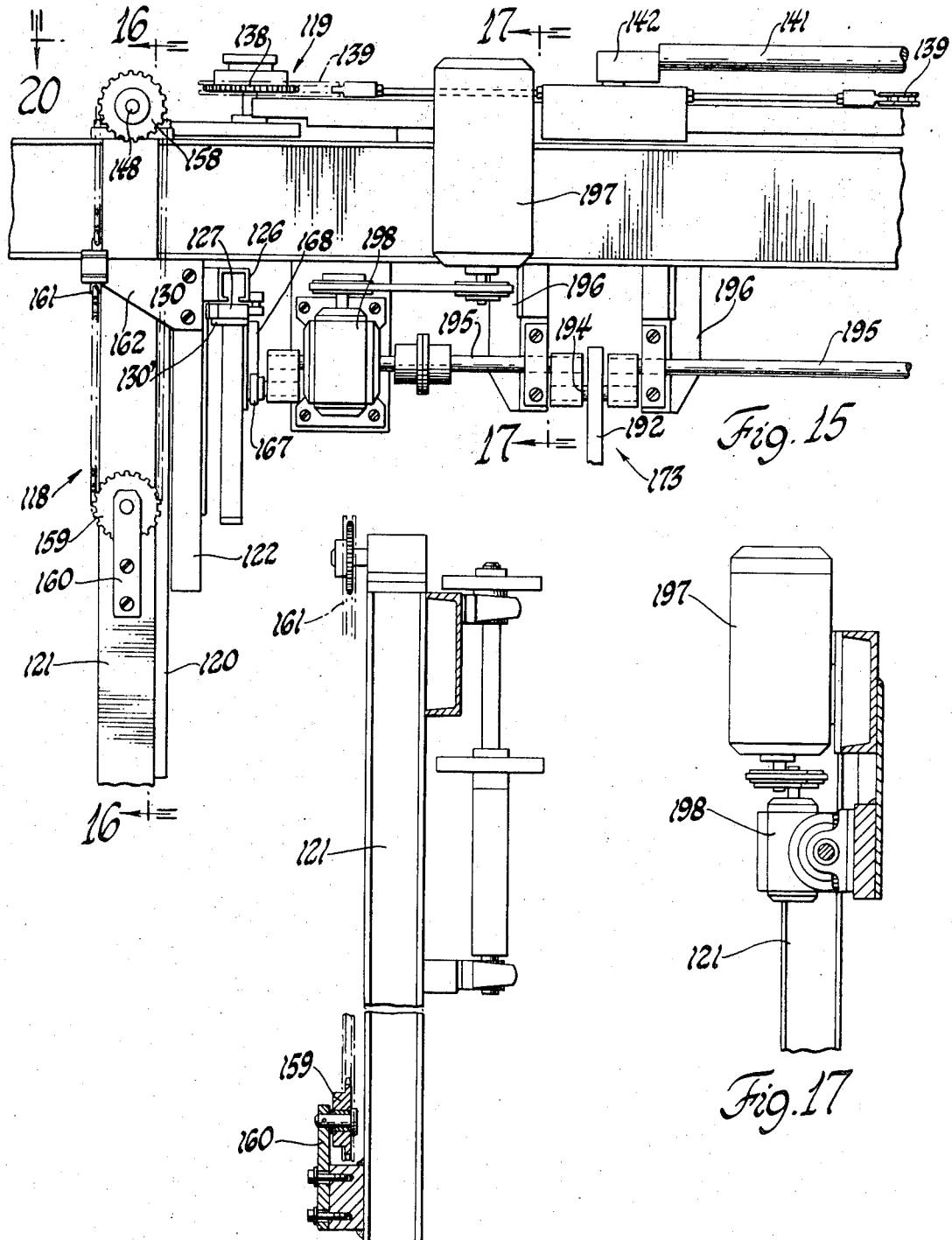

INVENTOR.
Harold A. McMaster

INVENTOR.
Harold A. McMaster
BY
Barnard, McEllynn & Leising
ATTORNEYS

Oct. 24, 1972  H. A. McMASTER  3,700,425
APPARATUS FOR CONVEYING GLASS SHEETS THROUGH
ADJACENT BENDING AND TEMPERING STATIONS
Original Filed Dec. 18, 1967  12 Sheets-Sheet 12

INVENTOR.
Harold A. McMaster
BY
Barnard, McGlynn & Reising
ATTORNEYS

United States Patent Office 3,700,425
Patented Oct. 24, 1972

3,700,425
APPARATUS FOR CONVEYING GLASS SHEETS THROUGH ADJACENT BENDING AND TEMPERING STATIONS
Harold A. McMaster, Woodville, Ohio, assignor to Guardian Industries Corporation, Detroit, Mich.
Original application Dec. 18, 1967, Ser. No. 691,326. Divided and this application Apr. 12, 1971, Ser. No. 132,943
Int. Cl. C03b 27/00
U.S. Cl. 65—348
22 Claims

ABSTRACT OF THE DISCLOSURE

An apparatus for curving a sheet of glass including a furnace having an elongated gas support bed for supporting sheets of glass thereover, conveying means for moving a sheet from the first end to the second end of the bed, a bending station disposed adjacent the second end of the bed and including a sheet supporting surface for supporting a sheet of glass on gases thereover, a shuttle means for moving a sheet of glass from the second end of the bed to the gas supporting surface in the bending station, a blasthead adjacent the bending station for impinging fluid against opposite sides of the sheet for cooling thereof, oscillating means in the blasthead for oscillating a sheet therein, and unitary frame means for lifting a sheet from the gas supporting surface in the bending station for bending the sheet and for thereafter moving the sheet into the blasthead while at the same time removing a sheet from the oscillating means in the blasthead to remove the sheet from the blasthead. The independently novel features of the conveying assembly are the shuttle means and its specific structure for moving a sheet of glass from the furnace to the bending station, the single unitary frame means for supporting a sheet in the bending station and moving it into the blasthead while simultaneously removing a sheet from the blasthead, the unique support of the forming surface means in the bending station against which a sheet is pressed for curving thereof, and an oscillating means in the blasthead for removing a sheet from the frame means and oscillating the sheet in the blasthead while it is being cooled, the latter being the claimed subject matter of this application with various other of the disclosed features claimed in co-pending applications Ser. No. 132,941 filed Apr. 12, 1971 and Ser. No. 133,092 filed Apr. 12, 1971 both also divisional applications of the below mentioned U.S. Pat. 3,607,200.

This application is a divisional of U.S. application Ser. No. 691,326 filed Dec. 18, 1967 now U.S. Pat. 3,607,200.

This invention relates to apparatus for curving and tempering a sheet of glass and particularly to a means for conveying a sheet through the apparatus.

In the prior art, the most predominately utilized apparatus to curve or bend a sheet of glass is one utilizing a pair of complementary mold surfaces wherein a sheet of glass is pressed between two surfaces. The disadvantages of such an apparatus are well known in the art, as for example, the marring or pitting of the surfaces of the sheet of glass as it is being pressed between the mold surfaces and/or the difficulties in maintaining the necessary shape in the sheet as it is inserted and removed from between the mold surfaces.

In some apparatuses, such as that disclosed in U.S. Pat. No. 3,294,516, a frame presses a sheet of glass against a mold surface. The problem with such devices is that after the sheet is curved or bent it cools sufficiently that a proper tempering is not attained when it is moved into an adjacent cooling atmosphere.

The instant invention is, therefore, directed to a novel apparatus for curving or bending a sheet of glass and thereafter tempering the sheet of glass so that successive sheets of glass are within tolerances heretofore unobtainable, i.e., successive sheets of glass are substantially equal or the same in shape. The apparatus includes a furnace through which sheets of glass are moved while supported on gas over a bed and heated. A bending station is disposed adjacent the second or output end of the furnace. The bending station has a gaseous support surface for supporting sheets of glass thereover and a forming surface means is disposed thereabove. Adjacent the bending station, a blasthead is disposed for receiving and cooling sheets of glass. This apparatus involves a combination of novel features which cooperate or coact to provide sheets of glass having tolerances heretofore unobtainable and each of these respective features are independently novel and are claimed in various of the above mentioned co-pending applications. The first such feature is a shuttle means disposed adjacent the second end of the furnace for moving a sheet of glass from the second end of the furnace to and over the gas support surface in the bending station. Another novel feature is the utilization of a unitary frame means which lifts a sheet of glass from the gas support surface in the bending station and presses it against the forming surface means for bending the sheet and thereafter moves the sheet into the blasthead while at the same time removes a sheet of glass from the blasthead. An additional novel feature which is claimed in this application is an oscillating mechanism or means utilized in the blasthead for removing a sheet of glass from the frame means as it is moved into the blasthead from the bending station and for oscillating the sheet until the unitary frame means removes the sheet therefrom to remove the sheet from the blasthead. More specifically, the oscillating mechanism engages a sheet for supporting the sheet while oscillating and is, in addition, retractable to allow movement of the frame means into and out of the blasthead. Another novel feature is the support of the forming surface means on the support structure through adjustment means so that the position of the forming surface means may be adjusted in any position and more specifically wherein the adjustment means is remotely disposed from the forming surface means to allow the position thereof to be adjusted from a position remote from the heat immediately adjacent the forming surface means. As alluded to above, these various features also coact in combination to provide a novel apparatus obtaining results not heretofore obtainable with prior art apparatuses.

The specific conveying means for moving respective sheets of glass through the furnace while the sheets are heated is also a novel feature but is the invention of another and is set forth in copending application Ser. No. 692,807 filed Dec. 22, 1967 in the name of Norman C. Nitschke and assigned to the assignee of the instant invention and now U.S. Pat. 3,574,588.

Other objects and attendant advantages of the present invention will be readily appreciated as the same becomes better understood by reference to the following detailed description when considered in connection with the accompanying drawings wherein:

FIG. 4 is an enlarged fragmentary cross sectional view taken substantially along line 4—4 of FIG. 1;

FIG. 5 is a view taken substantialy along line 5—5 of FIG. 4;

FIG. 14 is an enlarged fragmentary cross sectional view disclosing the oscillating mechanism in the blasthead as well as the unitary frame means;

FIGS. 15 and 15a are enlarged views taken substantially along line 15—15 of FIG. 14;

FIG. 16 is a cross sectional view taken along line 16—16 of FIG. 15;

FIG. 17 is a cross sectional view taken substantially along line 17—17 of FIG. 15;

FIG. 18 is a view taken substantially along line 18—18 of FIG. 15a;

FIG. 20 is a view of reduced scale taken substantially along line 20—20 of FIGS. 15 and 15a;

FIG. 21 is an enlarged fragmentary cross sectional view taken substantially along line 21—21 of FIG. 20;

Referring now to the drawings wherein like numerals indicate like or corresponding parts throughout the several views, an apparatus for bending a sheet of glass is generally shown at 30 in FIG. 1.

The apparatus 30 includes a furnace generally indicated at 31, a bending station generally indicated at 32, and a blasthead generally indicated at 33.

Figure 2:
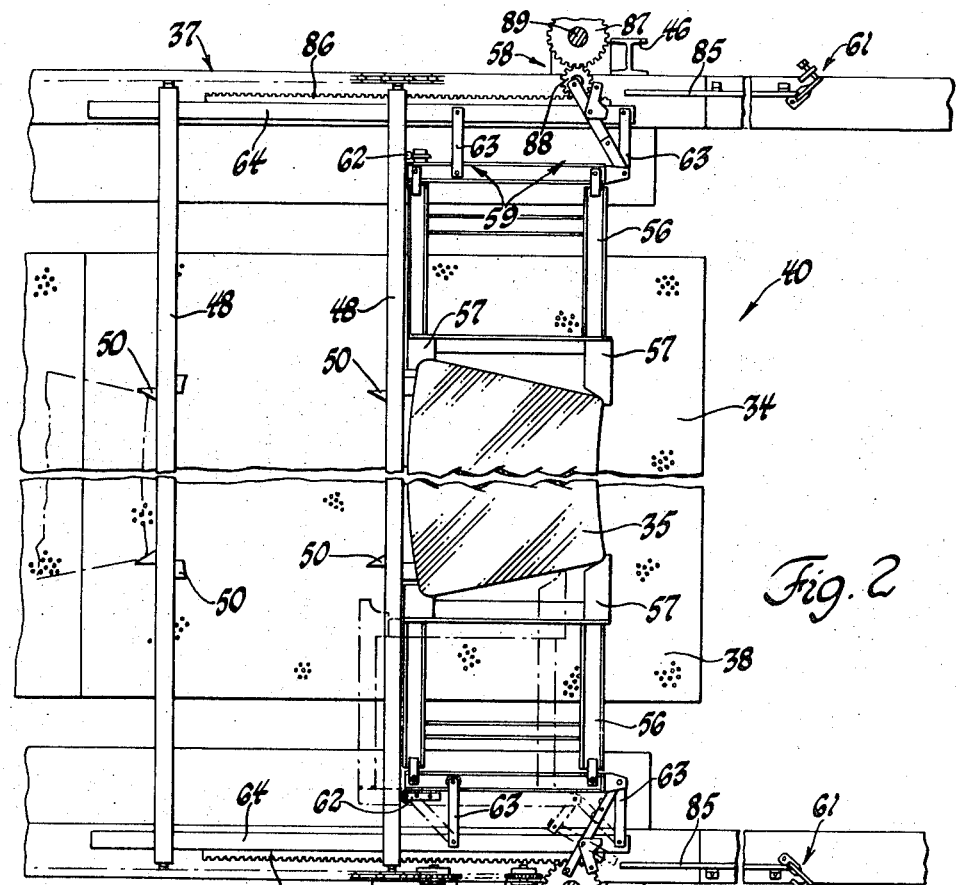
FIG. 2 is a fragmentary plan view disclosing the shuttle means for moving a sheet of glass from the bed within the furnace to the adjacent bending station.

The furnace 31 includes an elongated gas support bed 34 for supporting sheets of glass on a film of gas thereover, such as indicated at 35 in FIG. 2. The gas support bed 34 has a first end 36 extending from a first end of the furnace to provide a loading station.

A conveying means generally indicated at 37 moves a sheet of glass along the bed 34 from the first end 36 to a second end 38.

The bending station 32 is disposed adjacent the second end 38 of the support bed 34 and includes a glass sheet supporting surface for supporting a sheet on a film of gas thereover. In the preferred embodiment, the glass sheet supporting surface has apertures therein through which gases flow to support a sheet of glass on the film of gases over the sheet supporting surface. A forming surface means or mold 39 is disposed above the support surface in the bending station 32 for bending a sheet as the sheet is pressed thereagainst.

A shuttle means, which is generally shown at 40 in FIG. 2, moves a sheet of glass from the second end 38 of the bed 34 to and over the sheet supporting surface in the bending station 32.

A unitary frame means which is generally indicated at 41, lifts a sheet of glass from the sheet supporting surface in the bending station to press the sheet against the forming surface means 39 for bending the sheet and thereafter moves the sheet laterally or generally horizontally into the blasthead. Instead of utilizing the forming surface means 39, the frame means 41 may merely support a sheet to allow the sheet to sag under the force of gravity to the desired curvature and then move horizontally into the blasthead. As will become more clear hereinafter the unitary frame means 41 also includes a section which removes a sheet from the blasthead simultaneously with the movement of a sheet from the bending station to the blasthead. The sheet moved out of the blasthead is received by the conveyor which is generally indicated at 42 in FIG. 1.

Figure 22:
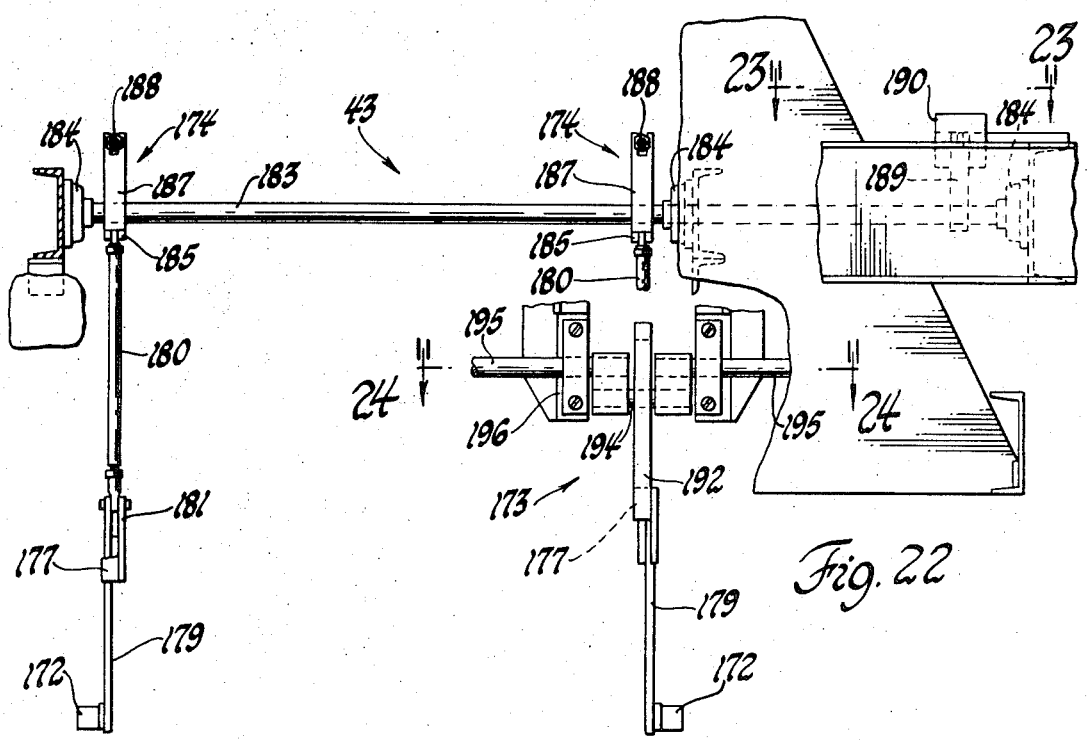
FIG. 22 is a fragmentary cross sectional view taken substantially along line 22—22 of FIG. 14.

There is also included an oscillating means, which is generally indicated at 43 in FIGS. 14 and 22, disposed in the blasthead for removing a sheet from the frame means 41 and for oscillating the sheet in the blasthead.

In the generally overall operation of the apparatus 30, hot gases are supplied through the bed 34 to provide a film or blanket of hot gases over the surface of bed 34. The furnace 31 also includes an upper module system 44 for supplying hot gases to the upper surfaces of the sheets as they move through the furnace. A sheet of glass is disposed on the bed 34 at the loading station 36. The conveying means 37 moves the sheet of glass along the gas support bed 34 toward the second end 38. During such movement the sheet of glass is being heated to a temperature to allow it to be deformed or bent. When the sheet of glass reaches the second end 38 of the bed 34, the shuttle means 40 will move the sheet of glass from the second end 38 of the furnace 31 to the bending station 32. Thereafter the frame means 41 will lift the sheet of glass upwardly to allow the sheet to deform or sag under the force of gravity or to press the sheet against the forming surface means 39 for bending the sheet. In the preferred embodiment, a vacuum is applied to the forming surface means 39 to pull the sheet into conformance with the surface thereof. An appropriate means may be utilized to apply a vacuum to passages in the forming surface means 39. After the sheet has been curved or bent, the frame means 41 moves laterally or horizontally to move the sheet into the blasthead 33 where it is removed from the frame means 41 by the oscillating means 43, the oscillating means 43 in turn oscillates the sheet in the blasthead while it is being cooled, annealed or tempered. As will be more clear hereinafter the frame means 41 also includes a section which removes a sheet from the oscillating means 43 and moves the sheet out of the blasthead to the conveyor 42.

The furnace also includes motor-blower combinations generally indicated at 45 for moving hot gases through the furnace to impinge upon the opposite surfaces of sheets of glass moving therethrough.

With this general background each of the features will now be described in detail.

CONVEYING MEANS FOR MOVING SHEETS OF GLASS THROUGH THE FURNACE

Figure 1:
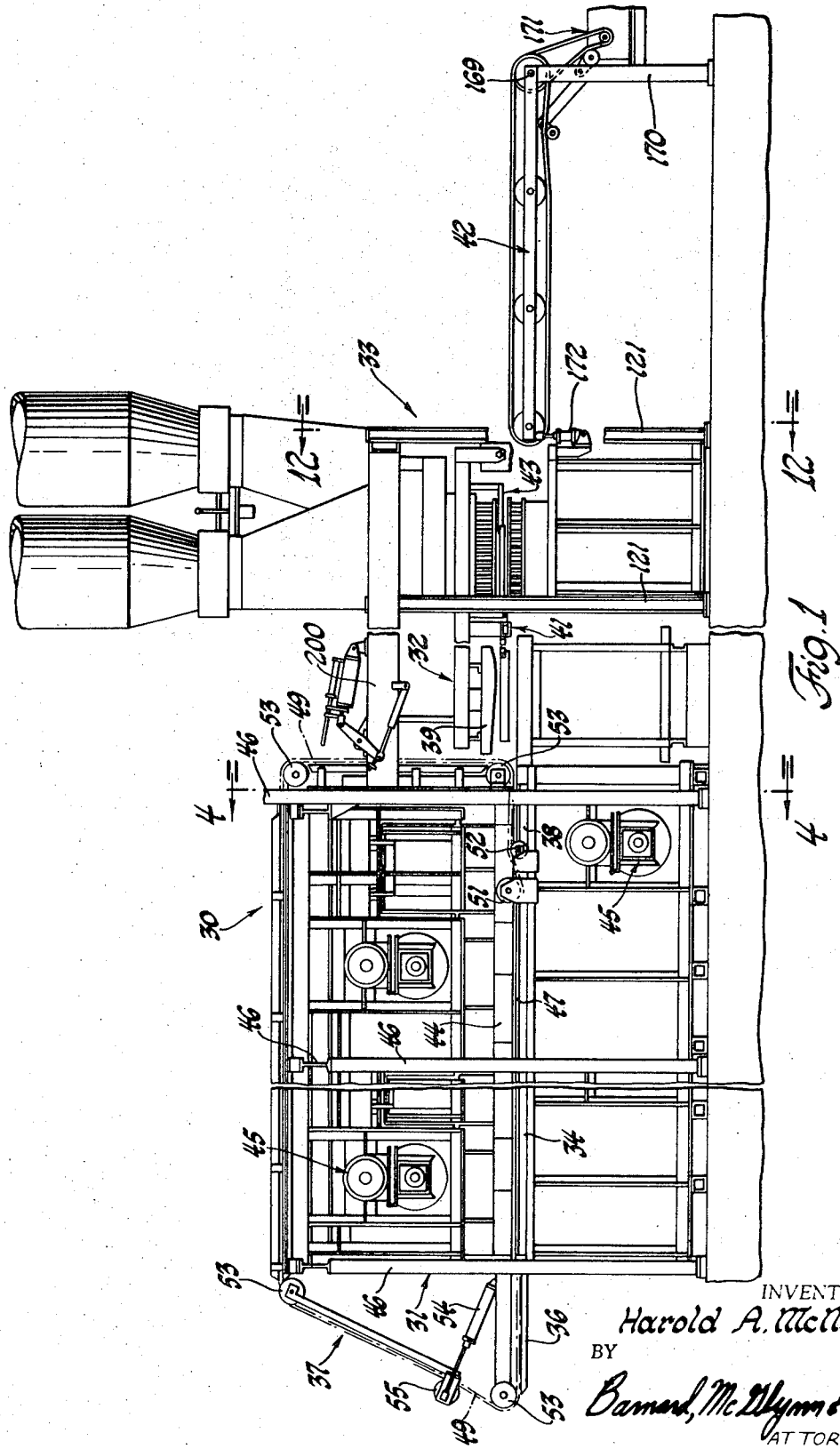
FIG. 1 is a side elevational view of a complete apparatus for curving and tempering a sheet of glass.

This is a specific description of the conveying means generally indicated at 37 in FIGS. 1 and 2.

The foremost problem associated with any conveying means utilized to move sheets of glass through a furnace where the sheets are being heated to a very high temperature is the effect of that high temperature upon the conveying means. Such high temperatures cause elongation and contraction of the conveying means and causes very rapid wear and frequent breakdown of the conveying means. These problems are greatly minimized by the conveying means 37.

The furnace 31 includes a support structure comprising the beams 46. The upright beams 46 are spaced a short distance from the side walls of the furnace 31. The furnace 31 has an elongated opening 47 in each side thereof and the openings are co-extensive with the bed 38. The furnace 31 also includes heating means preferably comprising gas burners disposed in the furnace for heating the hot gases therein to in turn heat the glass sheets moving over the bed 34.

The conveying means 37 includes sheet engaging means comprising a plurality of pusher bars 48 which extend into the furnace 31 through the opening 47 for moving sheets of glass along the bed 34. The conveying means 37 also includes drive means comprising a chain 49 disposed exteriorly of the furnace and connected to the pusher bars 48 for moving the latter along the furnace without being exposed to the heat within the furnace. In other words, each pusher bar extends through the furnace with its ends extending through the openings 47 on each side of the furnace. Thus, the ends of the pusher bars 48 are disposed exteriorly of the furnace. As best shown in FIG. 2, there is also included means comprising the tabs 50 projecting from each pusher bar to limit movement of a sheet along the longitudinal axis of each pusher bar.

As best illustrated in FIG. 1, each chain 49 is an endless loop which extends between the ends of the furnace adjacent the openings 47 and thereafter extends back to the first end to complete the endless loop.

There is also included means comprising a pair of first and second sprockets 51 and 52 on each side of the furnace and spaced from the second end of the furnace for disengaging each pusher bar 48 from a sheet of glass as the sheet of glass approaches a first station at said second end of said furnace, such first station being illustrated in FIG. 2 (the sprockets 51 and 52 being shown only on one side of FIG. 2). The sprockets 51 and 52 are positioned relative to one another so that the chains 49 move under the respective first sprockets 51 and then upward and over the respective second sprockets 52, as best illustrated in FIG. 1.

The conveying means 37 also include a plurality of sprockets 53 attached to the furnace for guiding the chains 49 along the openings 47 to the second end of the furnace and then upward to the top of the furnace and then along the top of the furnace to the first end of the furnace and then downward to complete the endless loop. As alluded to hereinbefore the bed 34 extends from the first end of the furnace to provide a loading station for positioning sheets of glass to be conveyed through the furnace by the pusher bars 48.

An important aspect of the apparatus is the fact that the upper surface of the bed 34 is disposed at an angle with respect to a horizontal plane so that the respective sheets of glass are pushed uphill, so to speak, against the force of gravity. In other words, the bed slants upwardly a very slight amount from the loading station to the other end 38. This disposition of the bed provides positive control of each sheet of glass. Hence, each sheet of glass will remain against the rear pusher bar when the forward or front pusher bar moves upwardly over the sprockets 51 and 52.

There is also included a tensioning means comprising the cylinder-piston arrangement 54 and the sprocket 55 associated with each chain 49 for maintaining a predetermined tension on the chains 49. The sprockets 55 are rotatably connected to the piston of the respective cylinder-piston arrangements 54.

The sprockets 51 and 52 disengage the pusher bars 48 from the rear edge of a sheet of glass at a station adjacent the second end of the furnace so that the shuttle means generally indicated at 40 in FIG. 2 may engage the sheet at this station as a pusher bar 48 is disengaged from the sheet to move the sheet out of the second end of the furnace and to a second station or position in the bending station 32.

SHUTTLE MEANS

The shuttle means 40 is a conveying assembly for moving a sheet of glass between spaced first and second stations. As illustrated, the first station is at the end 38 of the bed 34 in the furnace and the second station is in the bending station 32. As alluded to hereinbefore, the beams 46 provide a support structure and the bed 34 is a means for supporting the sheet. The shuttle means 40 is operatively connected to the support structure and is movable back and forth between first and second stations while at the same time is movable between a sheet engaging position, as illustrated in full lines of FIG. 2, and a retracted non-sheet engaging position, as illustrated in phantom in FIG. 2.

The shuttle means 40 includes a pair of opposed sheet engaging members 56. Each sheet engaging member 56 includes a plurality of interconnected elements forming a four sided frame with pad means 57 attached to the side opposite the other frame for engaging the edge of a sheet to be moved thereby.

There is also included an actuation means generally indicated at 58 in FIGS. 2 through 7 for moving the sheet engaging members 56 back and forth between the first and second stations. In addition, there is also included linkage means generally indicated at 59 in FIGS. 2 and 3 which operatively interconnects the sheet engaging members 56 and the actuation means 58 for controlling the movement of the members 56 so that the members 56 move away from one another in moving to the retracted position and move toward one another in moving to the sheet engaging position. The linkage means 59 includes means generally indicated at 60 in FIG. 3 for maintaining the sheet engaging members 56 in the sheet engaging position shown in full lines in FIG. 2 as the members 56 are moved from the first station to the second station, i.e., moved from the furnace to the bending station 32. A retract means is generally indicated at 61 for moving the sheet engaging members 56 to the retracted position shown in phantom in FIG. 2 as the members 56 are moved from the second station back to the first station, i.e., from the bending station back to the first station in the furnace.

Figure 3:
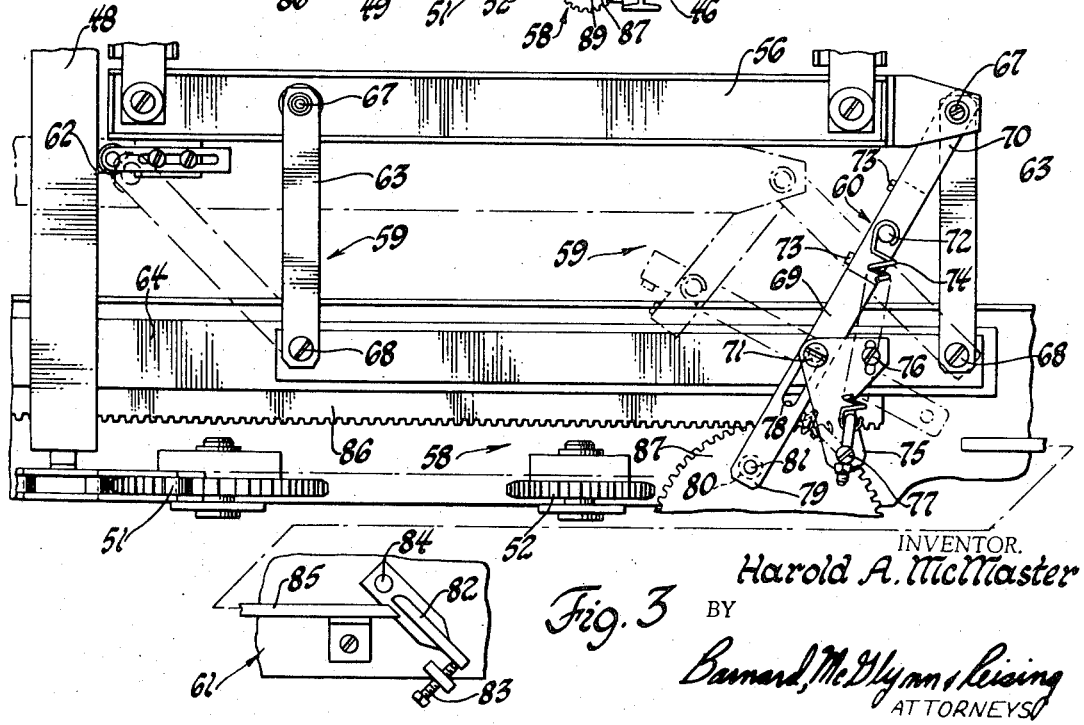
FIG. 3 is an enlarged fragmentary view of one side of the shuttle means and showing the sheet engaging members thereof in the sheet engaging position in full lines and in the retracted position in phantom.
Figure 6:
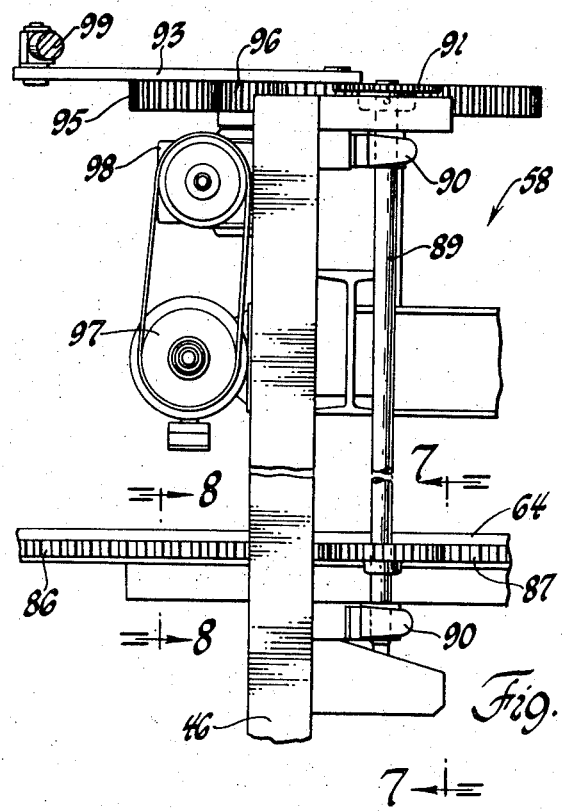
FIG. 6 is an enlarged fragmentary cross sectional view taken substantially along line 6—6 of FIG. 4.

At the beginning of a cycle the sheet engaging members 56 are in the retracted position illustrated in phantom in FIG. 2 and a conveying means comprising a pusher bar 48 moves a sheet into position between the sheet engaging members 56. A means comprising a roller 62 secured to each member 56 is included to contact a pusher bar as illustrated in FIG. 3 for moving the members 56 from the retracted position to the sheet engaging position as the sheet is moved between the members 56. In other words, as a pusher bar 48 moves a sheet of glass 35 into the space between the sheet engaging members 56, the rollers 62 engage the pusher bar 48 so that the pusher bar 48 moves the sheet engaging members 56 toward the sheet engaging position. It will be noted that during this movement, the velocity of the members 56 in a direction along the furnace is equal to the velocity of the engaging pushing bar 48 along the furnace; thus, the members move at the same velocity as the sheet to be engaged.

The movement of the sheet engaging members 56 from the retracted position to the sheet engaging position is controlled by the linkage means 59. The linkage means 59 includes a plurality of links 63 pivotally interconnecting the sheet engaging members 56 and the actuation means 58 so that the members 56 move with a sheet of glass in the direction the sheet of glass is being moved by the pusher bar 48 and simultaneously move in a direction toward one another, these directions being transverse to one another. In other words, when a pusher bar 48 contacts the rollers 62, the members 56 move longitudinally of the furnace and also move transversely of the furnace from the retracted position illustrated in phantom in FIG. 2 to the sheet engaging position illustrated in full lines in FIG. 2. It is to be noted that the linkage means 59 is disposed to coact between the actuation means 58 and the member 56 so that the members 56, in moving toward one another to engage a sheet, move toward one another rapidly at first and then slowly as they approach a sheet. In other words, the velocity of the outward ends of the links 63 in a direction transverse to the bed is greater when the links 63 first begin to pivot from the retracted or inclined position than when the links approach the sheet engaging or extended position.

Figure 7:
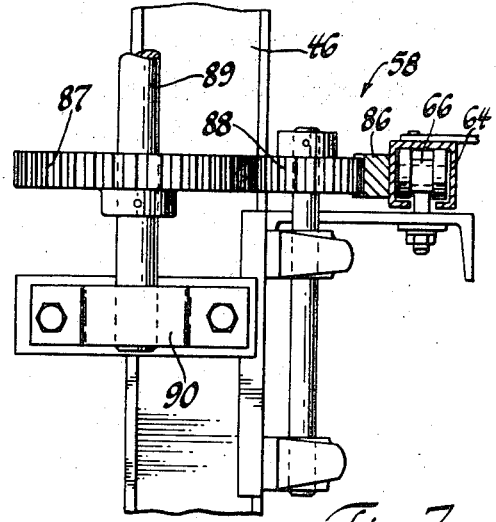
FIG. 7 is a fragmentary cross sectional view taken substantially along line 7—7 of FIG. 6.
Figure 8:
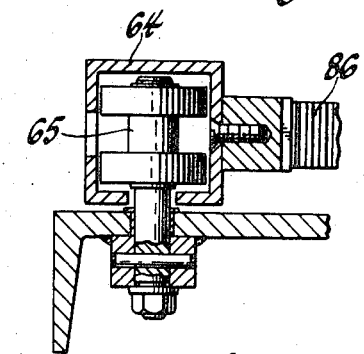
FIG. 8 is an enlarged cross sectional view taken substantially along line 8—8 of FIG. 6.

The actuation means 58 includes an elongated rail 64 associated with each of the sheet engaging members 56, i.e., a rail 64 disposed along each side of the furnace. Each rail 64 is operatively connected to the support structure by roller assemblies 65 and 66 for longitudinal movement relative thereto as best illustrated in FIGS. 7 and 8. It will be noted that each rail 64 is a substantially C-shaped beam with the rollers 65 disposed therein to prevent lateral movement and the rollers 66 disposed therein to prevent vertical movement. A spaced pair of the links 63 interconnect each rail 64 and its associated sheet engaging member 56. The links 63 of each pair are pivotally connected at a first end 67 to one of the sheet engaging members 56 and are pivotally connected at a second end 68 to the associated rail 64. The links 63 of each pair are substantially parallel to one another in all positions.

The means 60 for maintaining the members 56 in the sheet engaging position includes an elbow link comprising first and second sections 69 and 70 operatively interconnecting each member 56 and its associated rail 64. The first section 69 of each elbow link is pivotally connected to a rail 64 by a stud 71. The second section 70 of each elbow link is pivotally connected to the associated member 56 as indicated at 67. The first and second sections 69 and 70 are pivotally connected together through a pin 72 to pivot relative to one another as the members 56 are moved between the sheet engaging position and the retracted position. There is also included stop means 73 to limit relative pivotal movement between the first and second sections 69 and 70 for limiting pivotal movement of the links 63 relative to the rail 64 in the sheet engaging position. In other words, the first and second sections 69 and 70 of each elbow link pivot relative to one another between a cocked position as illustrated in phantom in FIG. 3 and a stop position as illustrated in full lines in FIG. 3. In the cocked position the members 56 are in the retracted position and the elbow link sections 69 and 70 cross one another while each pair of links 63 are disposed at an acute angle relative to the rails 64 and extend from the rails 64 in a direction generally opposite to the direction of movement of the sheet of glass. In the stop position, the stop means 73 limit relative pivotal movement between the sections 69 and 70 of the elbow links and the links 63 are substantially perpendicular to the rails 64 in this position as illustrated in full lines in FIG. 3. There is also included a biasing means comprising the spring 74 for maintaining each elbow link in the cocked and stop positions respectively. More specifically a support plate 75 is secured in position on the rails 64 by the stud 71 and the bolt 76 and includes an upwardly extending projection 77 to which one end of the spring 74 is attached. The other end of the spring 74 is secured to the pin 72. As is evident from viewing FIG. 3, when in the stop position the spring 74 urges the stop means 73 into engagement with the respective sides of the sections 69 and 70 to prevent further relative pivotal movement therebetween; thus, the spring 74 maintains the elbow link in the stop position. When the members move to the retracted or cocked position shown in phantom in FIG. 3, the spring 74 has moved overcenter and biases the elbow link sections 69 and 70 into the cocked position.

When the elbow links are in the stop position they limit further forward movement of the sheet engaging members 56. However, the first section 69 of each elbow link is pivotally connected to the associated rail 64 through a lost motion connection provided by the slot 78 for allowing limited movement of the members 56 beyond the sheet engaging position when the elbow links are in the stop position. In other words, should a pusher bar 48 continue to push the sheet engaging members 56 after they have reached the sheet engaging position, which might occur if the shuttle means is not moved out of the furnace at the proper time, the lost motion connection provided by the slot 78 will allow slight additional forward movement against the biasing action of the springs 74 to prevent damage to the components.

The first sections 69 of each elbow link include a distal end 79 which extends beyond the pivotal connection 71 thereof to the associated rail 64. The retract means 61 is disposed to coact with the distal ends 79 for moving the elbow links to the cocked position as the rails 64 move from the second station back to the first station.

More specifically the retract means 61 includes a projection taking the form of a roller 80 supported by a shaft 81 extending downwardly from each of the distal ends of the elbow links. The retract means 61 also includes a gate 82 and an associated stop 83 disposed adjacent each rail. Each gate 82 is pivotally connected by a shaft 84 to the support structure for abutting its associated stop 83. The gates 82 have a spring means (not shown) associated therewith so that each gate is biased against its associated stop 83. Each gate 82 is disposed so that the roller 80 of the associated elbow link engages and pivots the gate 82 from its stop 83 to allow the roller 80 to move past the gate as the members 56 are moving to the second station, i.e., as the members 56 are moving from the furnace to the bending station 32. The gates 82 are also positioned so that each roller 80 engages a gate 82 and forces the associated elbow link to the cocked position for moving the members 56 to the retracted position as the members 56 are moving back to the first station, i.e., from the bending station back to the end 38 of the bed 34. A plate 85 is secured to the support structure adjacent each rail 64. Plates 85 are vertical and substantially parallel to the rails 64 and are disposed adjacent the gates 82 so that the rollers 80 move along the plates 85 as the members 56 move back to the first station which is illustrated in FIG. 2. Each plate 85 is of a length so that the projections, i.e., the rollers 80, are free to move therepast as the members 56 are moved to the sheet engaging position while at the first station.

Now to more specifically describe the actuation means 58. There is included a rack 86 secured to each rail 64. A drive gear 87 operatively engages each rack. It will be noted that the drive gear 87 on one side of the furnace operatively engages the associated rack 86 through an idler gear 88 so that the drive gears 87 may rotate in the same direction to move the rail 64 in unison. There is also included means, best illustrated in FIGS. 6 and 7, for rotating the drive gears 87 to move the rails 64 which in turn move the members 56 back and forth between the first and second stations.

More specifically, the means for rotating the drive gears 87 includes a pair of parallel shafts 89 which are rotatably supported on the support structure by the brackets 90. Each shaft 89 supports one of the drive gears 87 adjacent the first end thereof. An input sprocket 91 is secured to each shaft 89 adjacent the second or upper end thereof. An endless loop chain means 92, as shown in FIGS. 4 and 5, is entrained or disposed in driving engagement with the input sprockets 91. There is also included a crank 93 rotated by a shaft 94. The shaft 94 in turn being rotated by a gear 95 and the gear 95 is rotated by a gear 96, the gear 96 being rotated by a motor 97 through the gear box 98. An arm 99 is attached to the chain means 92 at one end 100 and is attached to the crank 93 at the other end 101. The gears 95 and 96 and the motor 97 comprise a means for selectively rotating the crank 93 whereby the members 56 are moved back and forth between the first and second positions. In other words, when the members 56 are at one station, the crank 93 is in line with an axis extending between the sprockets 91 and extending away therefrom and, when the members 56 are at the other station, the crank 93 extends toward the sprockets 91 and is in line therewith. Rotary movement of the crank 93 oscillates the loop chain means 92 back and forth to move the rails 64 back and forth which in turn moves the members 56 back and forth between the first and second stations. As shown, the crank 93 is in an intermediate rotary position. It is to be noted, that the preferred actuation means includes a crank which produces a velocity of movement of the shuttle means which is a sinusoidal function, i.e., approximates a sine curve when plotted. Thus, the velocity is low at first, then increases to a maximum, and then decreases to a low as the movement ends.

To summarize the operation of the shuttle means 40, a sheet of glass 35 is moved between the sheet engaging members 56 by a pusher bar 48. The pusher bar 48 contacts the rollers 62 to move the members 56 from the retracted position shown in phantom in FIGS. 2 and 3 to the sheet engaging position shown in full lines in FIGS. 2 and 3. During this movement the links 63 are moved from the rearwardly inclined or angulated position to the perpendicular position illustrated in full lines. The movement of the links 63, to maintain the members 56 in the sheet engaging position, is limited by the elbow links comprising the first and second sections 69 and 70. As the sheet engaging members 56 reach the sheet engaging position, the pusher bar 48 moves upward due to the fact that the chains 49 move upward over the sprockets 52; thus, the pusher bar 48 moves over the shuttle means 40. Once the sheet engaging members 56 are in the sheet engaging position illustrated in full lines in FIG. 2, a sensing device, such as a microswitch, senses the sheet engaging position to actuate the motor 97 to rotate the crank 93 which in turn rotates the shafts 89 to move the rails 64 to the right as illustrated in FIG. 2 to move the sheet from the first station to the second station, i.e., from the furnace to the bending station 32. As will be described hereinafter a frame means moves the sheet vertically upwardly in the bending station 32 and thereafter the motor 97 is actuated to move the rails 64 back toward the first station or to the left as illustrated in FIGS. 2 and 3. During this movement to the right, the rollers 80 pivot the gates 82 and move therepast; however, during the return movement the rollers 80 engage the gates 82 to force the elbow links to the cocked position illustrated in phantom, which moves the sheet engaging members 56 to the retracted position illustrated in phantom in FIGS. 2 and 3. Once the shuttle means 40 is back at the first station, the sheet engaging members 56 are in the retracted position illustrated in phantom in FIGS. 2 and 3 and ready to receive another sheet of glass to be transferred from the furnace to the bending station 32. It is to be understood, that the shuttle means may be positioned at various positions along the second end of the bed without moving the sprockets 51 and 52 since a sensing means moves the shuttle means as soon as it reaches the sheet engaging position; hence, the pusher bars 48 need not be lifted since the shuttle means moves out of the furnace. The primary reason for lifting the pusher bars 48 is to allow the shuttle means to move back into the furnace after having moved a sheet to the bending station.

FRAME MEANS FOR BENDING THE SHEET OF GLASS, MOVING THE SHEET INTO THE BLASTHEAD AND MOVING THE SHEET OUT OF THE BLASTHEAD

This portion of the description relates to the frame means generally shown at 41 which is best shown in FIGS. 9 through 21.

Figure 12:
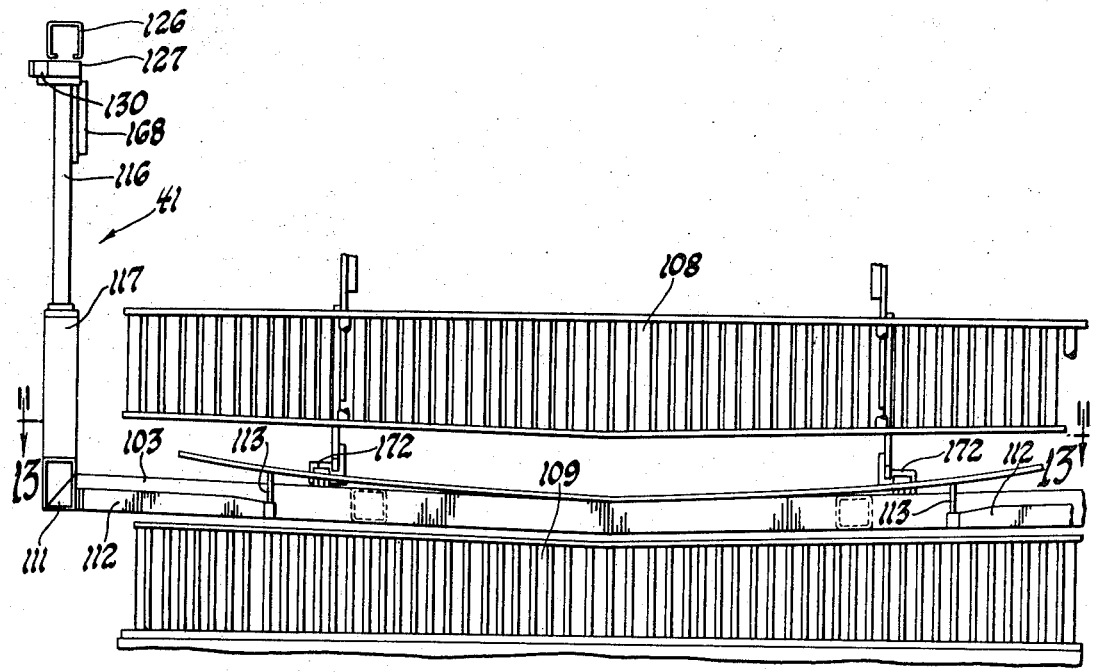
FIG. 12 is an enlarged fragmentary view taken substantially along line 12—12 of FIG. 1.
Figure 13:
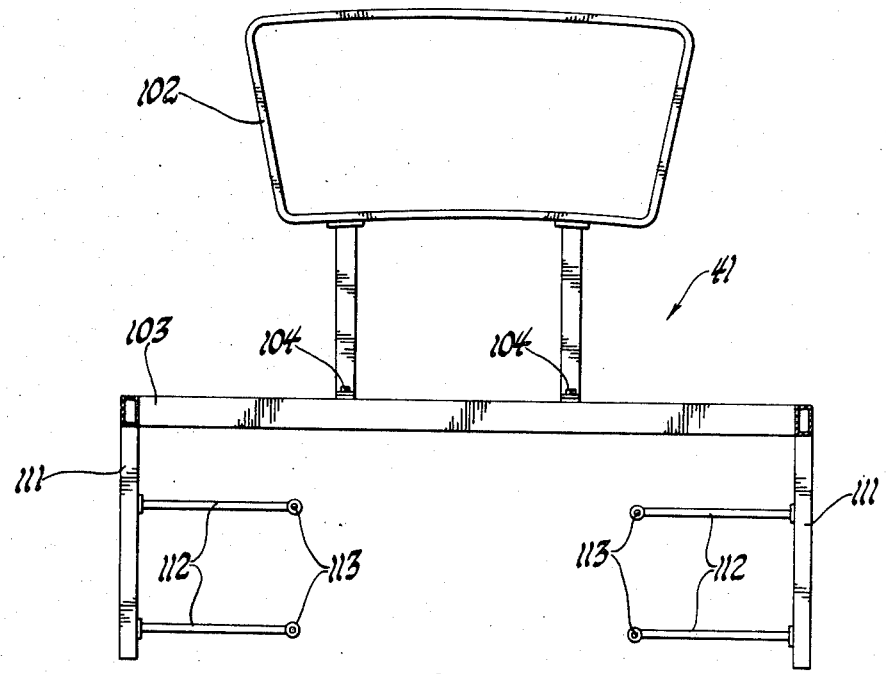
FIG. 13 is a cross sectional view taken substantially along line 13—13 of FIG. 12 and showing the unitary frame means.
Figure 15A:
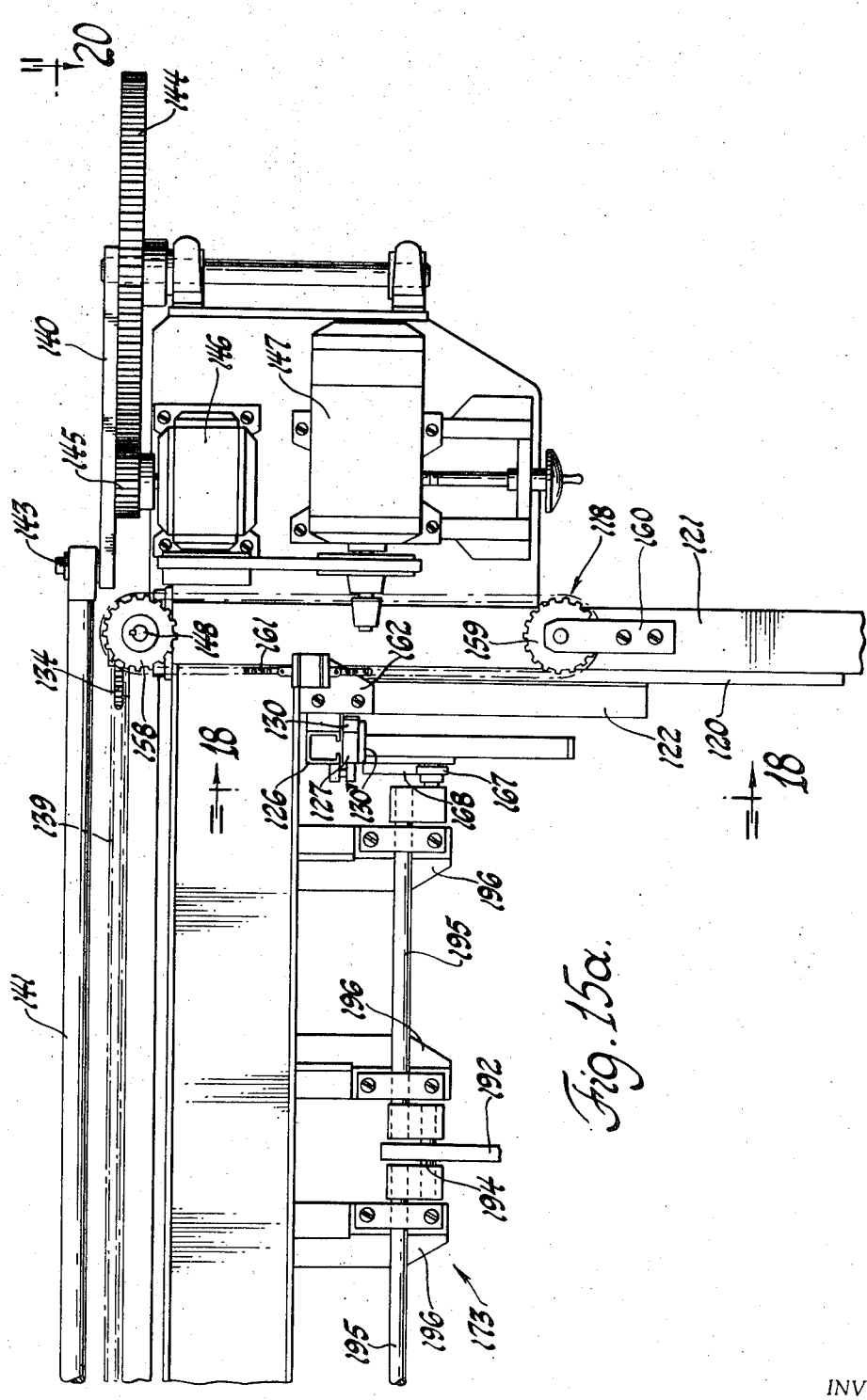

As set forth hereinbefore, the apparatus includes a sheet bending station 32 to which a sheet at a very high temperature is moved for bending or curving thereof. In addition, adjacent the bending station is disposed a blasthead 33 for impinging fluid on the bent or curved sheets for cooling, annealing or tempering the sheets. There is disclosed at 41 a unitary means for moving a sheet from the bending station 32 to the blasthead 33 while simultaneously moving the sheet out of the blasthead 33 where it is received by the conveyor 42. As best illustrated in FIGS. 12 and 13, the unitary means 41 includes a first frame means 102 for moving a sheet from the bending station 32 to the blasthead 33 and a second frame means 103 for moving a sheet out of the blasthead 33 as a sheet is moved into the blasthead by the first frame means 102. The first and second frame means 102 and 103 are rigidly connected together by the studs or bolts 104. The first frame means 102 is an endless loop for engaging the periphery of a sheet of glass of a particular shape. The first frame means 102 may however take different shapes depending upon the glass sheet to be treated; therefore, various different first frame means 102 may be connected to the second frame means 103 by the studs 104.

As alluded to hereinbefore, the bending station includes a gas support bed or surface 105 having passages 106 therein for supplying gases to the surface 105 for supporting a sheet of glass on the gases. In the preferred embodiment hot gases are supplied through the passages 106 for heating the sheet. This prevents the sheet from cooling and maintains the sheet at a sufficiently high temperature to obtain an appropriate temper in the blasthead. The bed 105 in the bending station includes a first recess means or groove 107 for allowing the first frame means 102 to be moved to a recessed position below the surface. It is to be understood that the recess means may be about the periphery of the bed 105 instead of within its periphery as illustrated.

The blasthead 33 includes upper and lower modules 108 and 109 respectively for impinging gases against opposite surfaces of a sheet disposed between the modules in the blasthead so that the sheet may be cooled, annealed or tempered. There is included a second recess means 110 which is shown shaded in FIG. 14, in the lower module 109 for receiving a portion of the second frame means 103 for allowing the second frame means to be recessed in the lower module 109 when the first frame means 102 is in its recessed position.

The second frame means 103 includes a pair of spaced beams 111 disposed along opposite sides of the lower module 109. A pair of parallel arms 112 are attached to each beam and extend toward the opposite beam as best illustrated in FIGS. 12 and 13. A finger 113 extends upwardly from the distal end of each arm 112 for engaging a sheet of glass as illustrated in FIG. 12.

At this point the movement of the first and second frame means will be summarized for the purpose of clarity. As alluded to hereinbefore, normally a forming surface means 39 is employed and a sheet of glass is moved over the recessed first frame means 102 in the bending station. Operating means then moves both the first and second frame means 102 and 103 upwardly from the recessed positions so that the first frame means 102 lifts the sheet of glass from the gas support surface 105 in the bending station 32 and presses the sheet of glass against the forming surface means or mold 39. While this is being accomplished the fingers 113 of the second frame means 103 move upwardly from the recess position and engage a sheet of glass (as illustrated in FIG. 12) to remove the sheet of glass from the oscillating means 43, which will be more specifically described hereinafter. Once the frame means 102 and 103 are in this raised position, the operating means means then moves both the first and second frame means 102 and 103 laterally or generally horizontally so that the sheet of glass on the first frame means 102 moves into the blasthead in the space between the upper and lower modules 108 and 109. At the same time, the sheet of glass disposed on the fingers 113 of the second frame means 103 moves out of the blasthead to the right as illustrated in FIG. 1 where the sheet of glass is removed from the fingers 113 by the conveyor 42.

Figure 18:
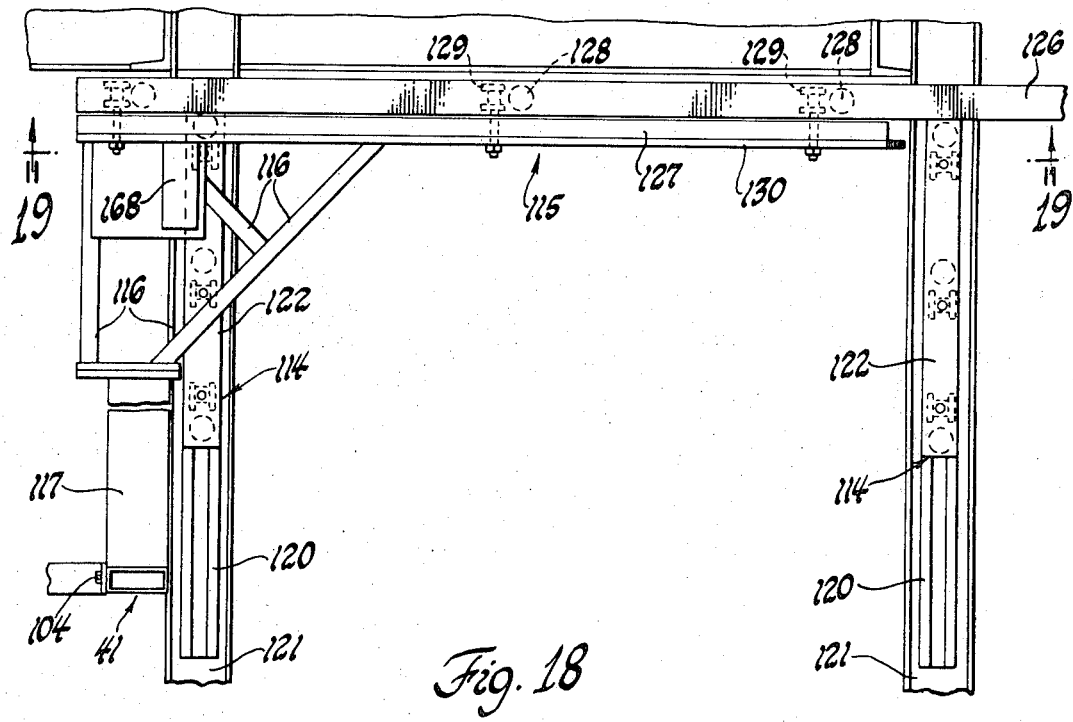
Figure 19:
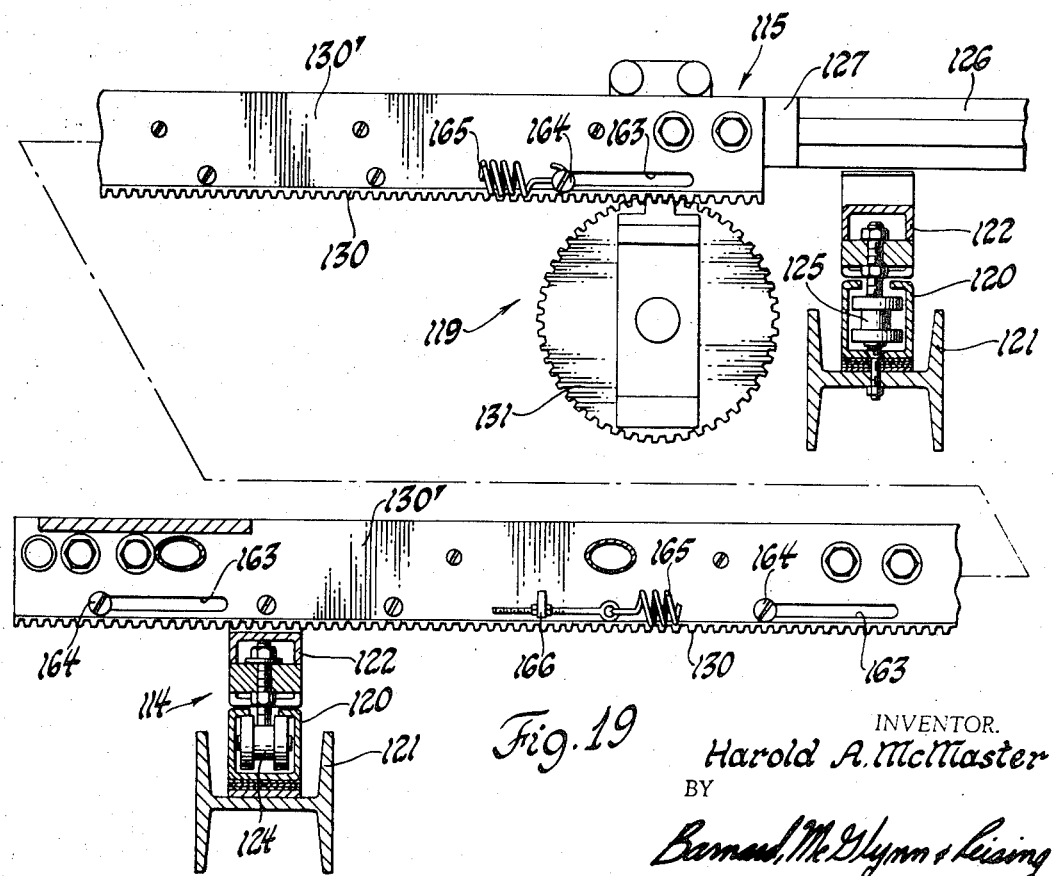
FIG. 19 is an enlarged fragmentary cross sectional view taken substantially along line 19—19 of FIG. 18.

The operating means, which is best illustrated in FIGS. 18 and 19, moves the first and second frame means 102 and 103 upwardly from the respective recessed positions for engaging respective sheets and moves the first and second frame means laterally to move the first frame means 102 from the bending station into the blasthead while simultaneously moving the second frame means 103 out of the blasthead. More specifically, the operating means includes a vertical guide means generally shown at 114 attached to the blasthead for vertical movement relative thereto and horizontal guide means generally indicated at 115 attached to the vertical guide means 114 for horizontal movement relative thereto. There is also included connecting means including the members 116 and 117 for attaching the first and second frame means 102 and 103 to the horizontal guide means 115 for movement therewith. The operating means also includes a vertical drive means, generally indicated at 118 in FIGS. 15a and 20, which is operatively connected to the vertical guide means 114 for moving the first and second frame means 102 and 103 vertically. In addition, there is included horizontal drive means generally indicated at 119 in FIG. 20 and operatively connected to the horizontal guide means 115 for moving the first and second frame means 102 and 103 horizontally. It is a very important feature that the sheet of glass remains on the first frame means while being curved and until moved into the blasthead and cooled sufficiently that it will not change shape. This allows a sheet to be heated to a very high temperature for curving yet maintains the shape to very close tolerances until it is cooled thereby producing successive sheets having almost exactly identical shapes.

The vertical guide means includes a pair of vertical elongated support beams 120 attached to the vertical structural beams 121 on each side of the blasthead. That is to say, there are a pair of such vertical elongated support means 120 on each side of the blasthead. A vertically movable beam 122 is operatively connected to each of the vertical support beams 120 through a plurality of roller assemblies 124 and 125, as best illustrated in FIG. 19. The roller assemblies 124 and 125 are disposed in opposite directions to prevent transverse movements of the vertically movable beams 122 relative to the vertical support beams 120. Thus, the vertically movable beams 122 may move vertically relative to the vertical support beams 120 upon actuation of the vertical drive means 118.

The horizontal guide means 115 includes a horizontal elongated support beam 126 attached to each pair of the vertically movable beams 122 on each side of the blasthead 33. There is also included a horizontally movable beam 127 operatively connected to each of the horizontal support beams 126 through a plurality of rollers 128 and 129 so that the horizontally movable beams 127 may move horizontally relative to the horizontal support beams 126 upon actuation of the horizontal drive means 119. It will be noted that the connecting means comprising the members 116 and 117 attaches the first and second frame means 102 and 103 to the horizontal movable beams 127.

Referring now more specifically to the horizontal drive means 119, there is included a rack 130 operatively connected through the plates 130' to each of the horizontally movable beams 127. The plates 130' are bolted or otherwise attached to the beams 127. In addition, there is also included a drive gear 131 engaging each of the racks 130 for moving the latter. First and second shafts 132 are respectively rotatably supported by brackets 133 and support and rotate the drive gears 131. A first sprocket 134 is connected to the first shaft 132 for rotating the latter. A third shaft 135 is rotatably supported by brackets adjacent the second shaft 132 as viewed in FIG. 20. A pair of intermediate gears 136 and 137 are respectively connected to the third and second shafts 135 and 132 and are in driving engagement with one another. A second sprocket 138 is connected to the third shaft 135 and an endless loop chain means 139 is disposed or entrained in driving engagement about the sprockets 134 and 138.

Figures 20, 21:
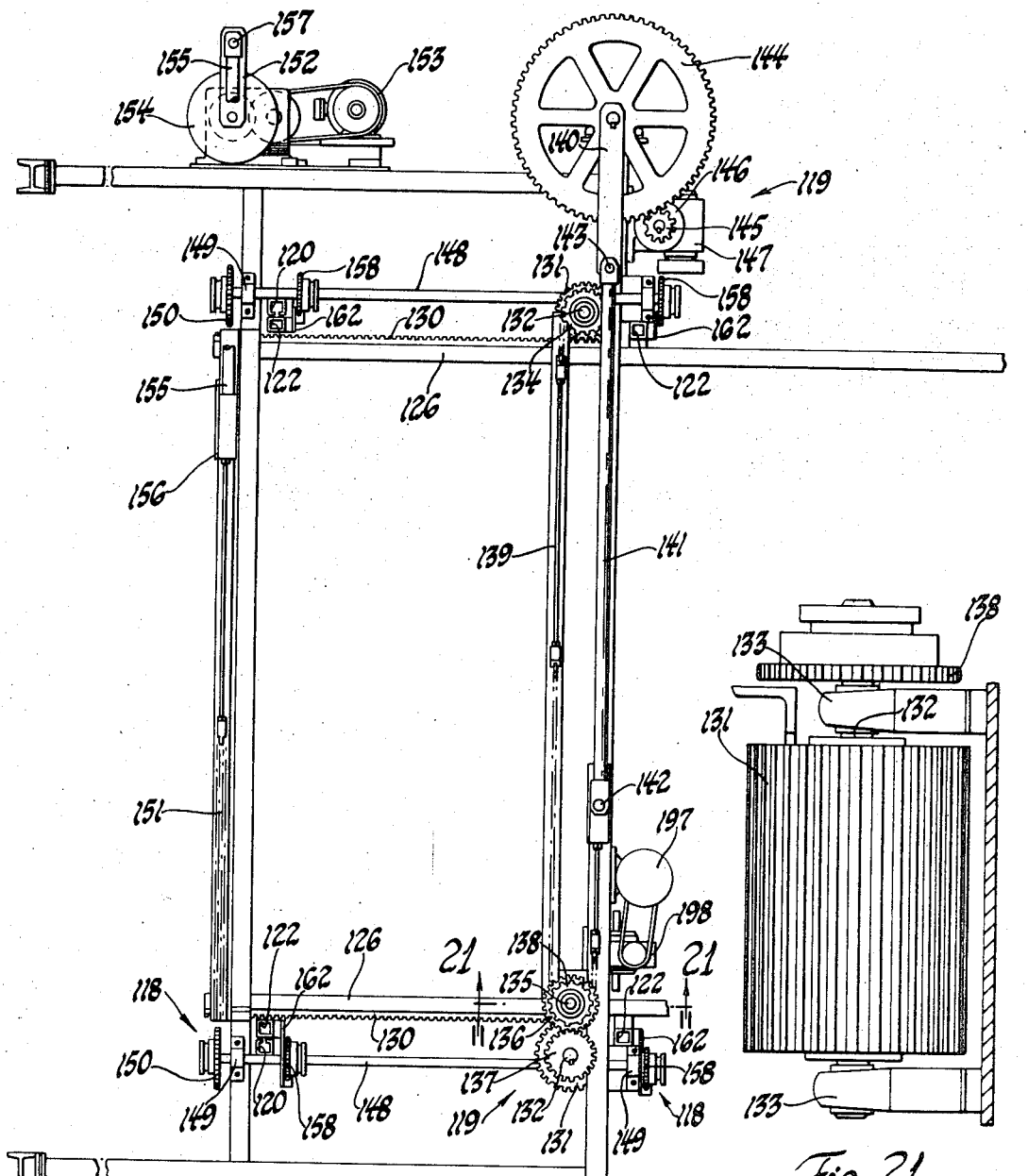

The chain means 139 is reciprocated by a crank 140 and an arm 141. The arm 141 is attached to the chain means 139 at one end 142 and is attached to the crank 140 at the other end 143. There is also included means including the gear 144, the gear 145, the gear box 146, and the motor 147 for selectively rotating the crank 140 whereby the horizontally movable beams 127 are moved horizontally to move the first and second frame means laterally or horizontally. It will be noted as illustrated in FIG. 21 that the drive gears 131 are elongated so that they remain in meshing engagement with the racks 130 as the racks 130 are moved vertically by the vertical drive means.

Turning now to the vertical drive means 118, there is included a horizontally extending shaft 148 rotatably supported on each side of the blasthead 33 by the brackets 149. An input sprocket 150 is secured to each of the shafts 148. A second endless loop chain means 151 is disposed about or entrained about the input sprockets 150. In this assembly, there is also included another or second crank 152 which is rotated by a motor 153 through a gear reduction box 154. Another or second arm 155 is connected at one end 156 to the chain means 151 and at the other end 157 to the crank 152. Thus, as the motor 153 is actuated the arm 155 is reciprocated to oscillate the loop chain means 151.

A pair of lift sprockets 158 is secured to each of the shafts 148. There is also included a coacting lift sprocket 159 associated with each of the lift sprockets 158 and rotatably supported on the blasthead by the brackets 160. Each coacting lift sprocket 159 is disposed in vertically spaced relationship to the associated lift sprocket 158. A chain 161 is entrained about each lift sprocket 158 and its associated coacting lift sprocket 159. There is included means comprising the brackets 162 interconnecting the vertically movable beams 122 and the chains 161, it being noted that the brackets 162 are attached to corresponding reaches of the chains 161. In other words, each chain 161 is an endless loop disposed in parallel relationship to the other chain and both chains are driven in the same direction at the same time since the sprockets 158 are rotated in unison in the same direction at the same time. Thus, corresponding reaches of the respective chains 161 are moving in the same direction at the same time and, therefore, the brackets 162 are attached to corresponding reaches of the chains 161.

Thus, it will be understood that upon actuation of the motor 153, the shafts 148 will rotate to move the chains 161 which will in turn vertically move the vertically movable beams 122 to vertically move the beams 126 and 127; thus, resulting in vertical movement of the first and second frames 102 and 103.

Another important aspect, is that each of the racks 130 is connected to its associated horizontally movable beam 127 through a lost motion connection as defined by the slots 163 in FIG. 19. This lost motion connection allows the horizontally movable beams 127 to move between first and second positions relative to the racks 130. In other words, the bolts or screws 164 extend through the slots 163 in the plates 130' and engage the racks 130 but are slidable along the slots 163. A biasing means comprising the springs 165 react between the racks 130, by being attached to one of the bolts 164, and the horizontally movable beams 127, by being attached to the extension 166, for urging the horizontally movable beams and the racks to the first position as illustrated in FIG. 19. The strength of the springs 165, however, is sufficient that the horizontally movable beams 127 will move with the racks 130 upon rotation of the drive gears 131. The assembly also includes means operatively coacting with the horizontally movable beams 127 for oscillating the latter by moving the horizontally movable beams 127 relative to the racks 130 and against the biasing action of the springs 165, such means being the offset cams 167. Plates 168 are supported by the members 116 and are engaged by the offset cams 167 when the first frame means 102 is disposed in the blasthead 33. The offset cams 167 are in reality eccentric cams which engage the plates 168 to move the frames against the biasing action of the springs 165; thus, oscillating the horizontally movable beams 127 independently of movement of the racks 130. The rotation of the offset cams 167 will be explained more fully hereinafter in connection with the description of the oscillating means in the blasthead.

In accordance with the foregoing description, therefore, a sheet of glass may be lifted vertically upward from the gas support surface 105 in the bending station and then move horizontally into the blasthead between the upper and lower modules 108 and 109 by the first frame means 102 and thereafter oscillated in the blasthead while on the first frame means 102 due to the fact that the horizontally movable beams 127 may oscillate independently of movement of the racks 130, all of this while another sheet is simultaneously lifted from the oscillating means and moved from the blasthead while supported on the fingers 113 of the second frame means 103.

In summation of the operation of the unitary frame means, an appropriate sensing means is utilized in the bending station to sense when a sheet of glass is supported on the bed 105 above the first frame means 102 to actuate the motor 153. Upon actuation of the motor 153 the shafts 148 are rotated which results in upward movement of the vertically movable beams 122. The horizontally movable beams 127 are operatively connected to the vertically movable beams 122; thus, upward movement thereof results in upward vertical movement of the first and second frame means 102 and 103. During this upward or vertical movement of the first frame means 102, a sheet of glass is moved upwardly to sag under the force of gravity or is pressed against the forming surface means 39 to be bent. At the same time, the fingers 113 of the second frame means 103 engage a sheet of glass as illustrated in FIG. 12 to remove it from the oscillating means. Once the first and second frames 102 and 103 had been moved to the extreme upward position, an appropriate sensing means such as a microswitch senses this upward extreme position and actuates the motor 147 which results in rotation of the drive gears 131 and the drive gears 131 mesh with the racks 130 to move the horizontally movable beams 127 horizontally to move the first frame means 102 into the blasthead and to move the second frame means 103 out of the blasthead and over the end of the conveyor 42. As will be more fully described hereinafter, the conveyor 42 removes the sheet of glass from the fingers 113 of the second frame means 103 and at the same time the oscillating means 43 removes the sheet of glass from the first frame means 102.

During the transfer of a sheet of glass from the first frame means 102 to the oscillating means 43 it is necessary, however, to oscillate the first frame means 102 in unison with the oscillating means 43. This operation will become more clear hereinafter, however, the offset cams 167 engage the plates 168 to oscillate or move the horizontally movable beams 127 back and forth so that the first frame means 102 moves in unison witth the oscillating means 43 as a sheet of glass is transferred from the first frame means 102 to the oscillating means 43.

As alluded to hereinbefore, the conveyor 42 is disposed adjacent the blasthead 33 for moving a sheet of glass from the fingers 113 of the second frame means 103 when the latter is moved out of the blasthead 33. The conveyor 42 has a first end disposed adjacent the blasthead 33 and a second end remotely spaced from the blasthead. The conveyor 42 is pivotally supported at the second end as indicated at 169 for pivotal movement in a vertical plane. That is, a structural member 170 pivotally supports the second end of the conveyor 42 at 169. A drive means 171 moves the endless conveyor 42. The first end of the conveyor is supported by a means comprising the air cylinder 172 whereby the air cylinder 172 may raise the first end of the conveyor 42 to engage the conveyor with a sheet of glass supported on the fingers 113 of the second frame means 103 to remove a sheet of glass from the fingers 113. Thereafter a sheet of glass is conveyed by the conveyor 42 away from the blasthead 33.

MEANS FOR OSCILLATING SHEET IN BLASTHEAD

As alluded to hereinbefore, there is also included means generally indicated at 43 in FIGS. 14 and 22 for oscillating a sheet of glass in the blasthead. As already described, the blasthead includes vertically spaced upper and lower modules 108 and 109 for impinging fluid against opposite sides of a sheet of glass.

The assembly includes sheet engaging means including the arms 172 for engaging a sheet of glass and oscillating the sheet in the blasthead. There is also disclosed, in FIGS. 14, 15 and 22, oscillating means generally indicated at 173 for oscillating the sheet engaging means. In addition, there is also included vertical retract means generally shown at 174 in FIGS. 14 and 22 for vertically retracting the sheet engaging means.

There are two pair of arms 172, and the arms of each pair extend toward one another and into the space between the upper and lower modules 108 and 109. There are two pair of the arms 172 with each pair being disposed adjacent each side of the blasthead. An arm of each pair extends toward the arm of the other pair, in other words, FIG. 22 shows one arm of each pair. There is included means comprising a fluid actuated cylinder-piston 175 supported on the arms 172 for engaging the edge of a sheet of glass. In other words, there is a cylinder-piston 175 connected to the distal end of each arm 172. A pad 176 is connected to each piston for engaging and supporting a sheet of glass.

The assembly also includes a sway bar 177 extending along the blasthead adjacent each side. There are spaced first and second depending members 178 and 179 extending downwardly from each sway bar 177. The arms 172 are respectively connected to and extend in a cantilevered manner from the lower ends of the depending members 178 and 179. The arms 172 may be connected to the depending members 178 and 179 by welding, bolting or in any other appropriate manner.

The assembly also includes a pair of spaced pendulum links 180 associated with each sway bar 177. The pendulum links 180 are operatively connected to the blasthead adjacent the upper ends thereof for swinging movement relative thereto and are pivotally connected to one of the sway bars 177 adjacent the lower ends thereof so that the sway bars are free to oscillate. More specifically, the brackets 181 are welded, bolted or otherwise secured to the sway bars 177 and are pivotally connected at 182 to the pendulum links 180.

Figure 23:
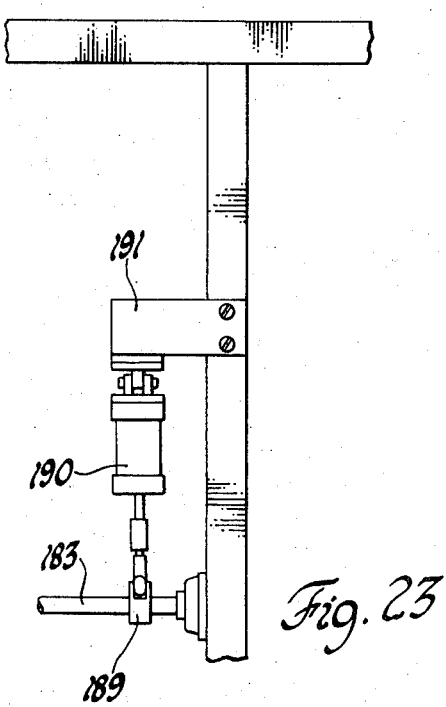
FIG. 23 is a fragmentary view taken substantially along line 23—23 of FIG. 22.
Figure 24:
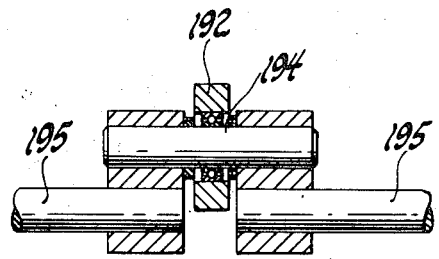
FIG. 24 is an enlarged fragmentary cross sectional view taken substantially along line 24—24 of FIG. 22.

The vertical retract means 174 includes a pair of spaced lift shafts 183 which are rotatably supported in the bearings 184 on the blasthead structure. The lift shafts 183 extend between the sides of the blasthead 33, i.e., the lift shafts 183 extend across or transversely of the blasthead 33. A lift arm 185 is connected to and extends from each lift shaft 183 adjacent each end of each lift shaft 183. The distal end of each lift arm 85 is pivotally connected at 186 to one of the pendulum links 180 so that the pendulum links 180 and the sway bars 177 move vertically upon rotation of the lift shafts 183. At least one drive arm 187 is connected to and extends from each lift shaft 183. As illustrated in the preferred embodiment, the lift arms 185 and drive arms 187 are portions of one integral member; however, it will be recognized that they may be separate members. A link 188 is pivotally connected at one end to a drive arm 187, which is connected to one lift shaft 183, and is pivotally connected at the other end to a drive arm which is connected to the other lift shaft 183. Two links 188 are disclosed although only one may be utilized. There is also included means comprising the fluid actuated cylinder-piston 190 and lever 189 for rotating one of the lift shafts 183. As best illustrated in FIG. 23 the piston-cylinder 190 is mounted on a bracket 191 which is in turn secured to the blasthead support structure. It will be noted that upon actuation of the cylinder-piston 190 the piston thereof, being operatively connected to the lever 189, moves the lever 189 to rotate the shaft 183 which in turn vertically moves the pendulum links 180 and sway bars 177.

The oscillating means 173 includes a cam follower member 192 extending upwardly from each of the sway bars 177. Each cam follower member 192 has an elongated aperture 193 therein and an eccentric cam 194 engages each cam follower member 192 so that the sway bars 177 are oscillated upon rotation of the eccentric cams 194. A drive shaft 195 is rotatably supported on the blasthead through the brackets 196 and extends across the blasthead. The eccentric cams 194 are connected to the drive shaft 195 so as to be rotated thereby. The eccentric cams 194 are in phase, i.e., offset radially from the axis of the shaft 195 in the same direction, to oscillate the sway bars 177 in unison upon rotation of the drive shaft 195. The motor 197 drives a gear box 198 through a V-belt and the gear box 198 in turn rotates the shaft 195 so as to rotate all the eccentric cams 194 and to rotate the offset cams 167 as hereinbefore described. The offset cams 167 and the cams 194 are all in phase so that upon actuation of the motor 197, the sheet engaging pads 176 of the oscillating means are oscillated back and forth in unison with the first and second frame means 102 and 103. Thus, the pads 176 oscillate back and forth with the first frame means 102 when it is in the blasthead so that cylinder-pistons 175 may be actuated to move the pads 176 under the edges of a sheet of glass on the first frame means 102 so as to remove the sheet of glass therefrom. The first frame means 102 has recesses, apertures, or grooves at four positions corresponding to the four positions of the pad means 176 for allowing the pad means 176 to be disposed beneath the edges of a sheet of glass supported on the first frame means 102.

In the operation of the oscillating means 43, the cylinder-piston 190 is normally actuated so as to rotate the lift shafts 183 in a clockwise direction as illustrated in FIG. 14 to raise the sway bars 177 vertically; thus, vertically retracting the sheet engaging pads 176. While in this position the first frame means 102 may be moved as hereinbefore described to move a sheet of glass into the space between the upper and lower modules 108 and 109 of the blasthead. At this point the motor 197 is activated so that the first frame means 102 is oscillated back and forth in the blasthead due to the movement of the offset cams 167. At the same time the sway bars 177 are oscillated back and forth because of the rotary movement of the eccentric cams 194. Thus, the pads 176 and the first frame means 102 are oscillated back and forth in unison. The cylinder-piston 190 is then operated to rotate the lift shafts 183 in a counterclockwise direction as viewed in FIG. 14 to lower the sway bars 177 so that the pads 176 are horizontally in line and oscillating with the first frame means 102. At this point the cylinder-pistons 175 are actuated to move the sheet engaging pads 176 into engagement with the edges of a sheet of glass. The vertical retract means 174 is then operated to raise the sway bars 177 which in turn moves the sheet engaging pads 176 upwardly and out of the path of movement of the frame means 102 and 103. At this point the first and second frame means 102 and 103 are respectively moved to their recessed positions while the oscillating means 43 continues to support and oscillate a sheet of glass between the upper and lower modules 108 and 109 of the blasthead for cooling, annealing or tempering of the sheet.

When the next sequence is started again, that is, when the first frame means 102 moves vertically upwardly to engage and support a sheet of glass, the second frame means 103 moves upwardly from the recessed position so that the fingers 113 thereof engage and remove a sheet of glass from the sheet engaging pads 176. The sway bars 177 are again moved vertically upwardly and as the first frame means 102 moves into the blasthead the fingers 113 of the second frame means 103 move out of the blasthead while carrying a sheet of glass. As hereinbefore described the conveyor 42 removes the sheet of glass from the fingers 113 of the second frame means 103.

FORMING SURFACE MEANS OR MOLD

As mentioned hereinbefore, the preferred embodiment of the apparatus disclosed for bending or otherwise deforming a sheet of glass includes at least one forming surface means 39 in the bending station 32. As illustrated in FIG. 1, the support structure includes the beams 200 and the blasthead 33 is disposed adjacent the bending station 32 for impinging fluid on sheets of glass. The frame means 102 presses a sheet vertically upwardly against the forming surface means 39 to bend the sheet. There is also included lift means generally shown at 201 for raising the forming surface means 39 after a sheet has been thrust thereagainst to allow the frame means 102 to move generally horizontally away and into the blasthead 33. There is included a pair of spaced support beams 202 and 203 connected to the forming surface means 39 adjacent one end thereof through the brackets generally indicated at 204. In the preferred embodiment, the forming surface means 39 comprises a mold. The support beams 202 and 203 extend generally horizontally to second ends thereof which are operatively connected to the support structure for pivotal movement relative thereto. Adjustment means 205 interconnects the beams 202 and 203 and the support structure at a position remote from the forming surface means 39 and includes first means for changing the vertical position of the forming surface means 39 and second means for changing the horizontal position of the forming surface means 39. The adjustment means also includes a third means generally indicated at 206 extending generally upwardly from the forming surface means or mold 39 and operatively connected to the support structure for vertically positioning the forming surface means 39. As illustrated, the lift means 201 interconnects the third means 206 and the support structure for selectively raising the forming surface means 39.

Figure 10:
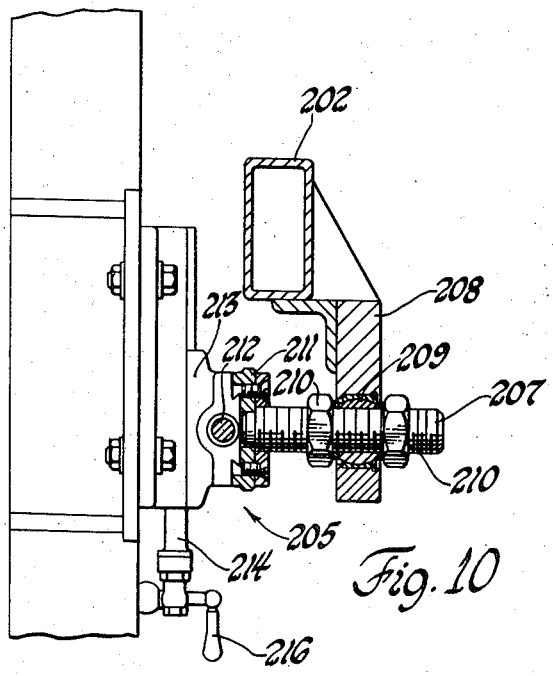
FIG. 10 is an enlarged fragmentary cross sectional view taken substantially along line 10—10 of FIG. 9.

Although only one is illustrated in FIG. 10, each support beam (202 as illustrated in FIG. 10) is rotatably supported on a generally horizontal stub shaft 207. The beam 202 is secured to a bracket 208 and that bracket 208 is supported on a spherical type bearing 209. Bracket 208 may swivel relative to the shaft 207. A pair of nuts 210 are disposed on each side of the bracket 208 but threadedly engage the stub shaft 207 so that the position of the support beams axially on the stub shafts may be adjusted. In fact, the other stub shaft for supporting the beam 203 need not be threaded since the position of the support beam 203 may be determined by adjustment of the position of the support beam 202 axially of the stub shaft 207. The first and second means interconnecting the stub shafts 207 and the support structure so that the vertical position of the stub shaft may be adjusted and the horizontal position of the stub shafts may be adjusted include a compound interconnecting each stub shaft 207 and the support structure. Each compound includes a horizontally movable member 211 which, as illustrated, supports the stub shaft 207, and a first lead screw 212 operatively coacting therewith for adjusting the horizontal position of the member 211, as is well known in a compound. There is also included a vertically movable member 213 and a second lead screw 214 operatively coacting therewith to adjust the vertical position of the member 213, which in turn adjusts the vertical position of the stub shaft 207. The threaded shafts 212 and 214 may be manually rotated by handles of the type shown at 216. Upon rotation of the lead screw 212 the horizontal position of the associated stub shaft 207 may be adjusted in a direction which is perpendicular to the axis of the stub shaft 207.

Figure 9:
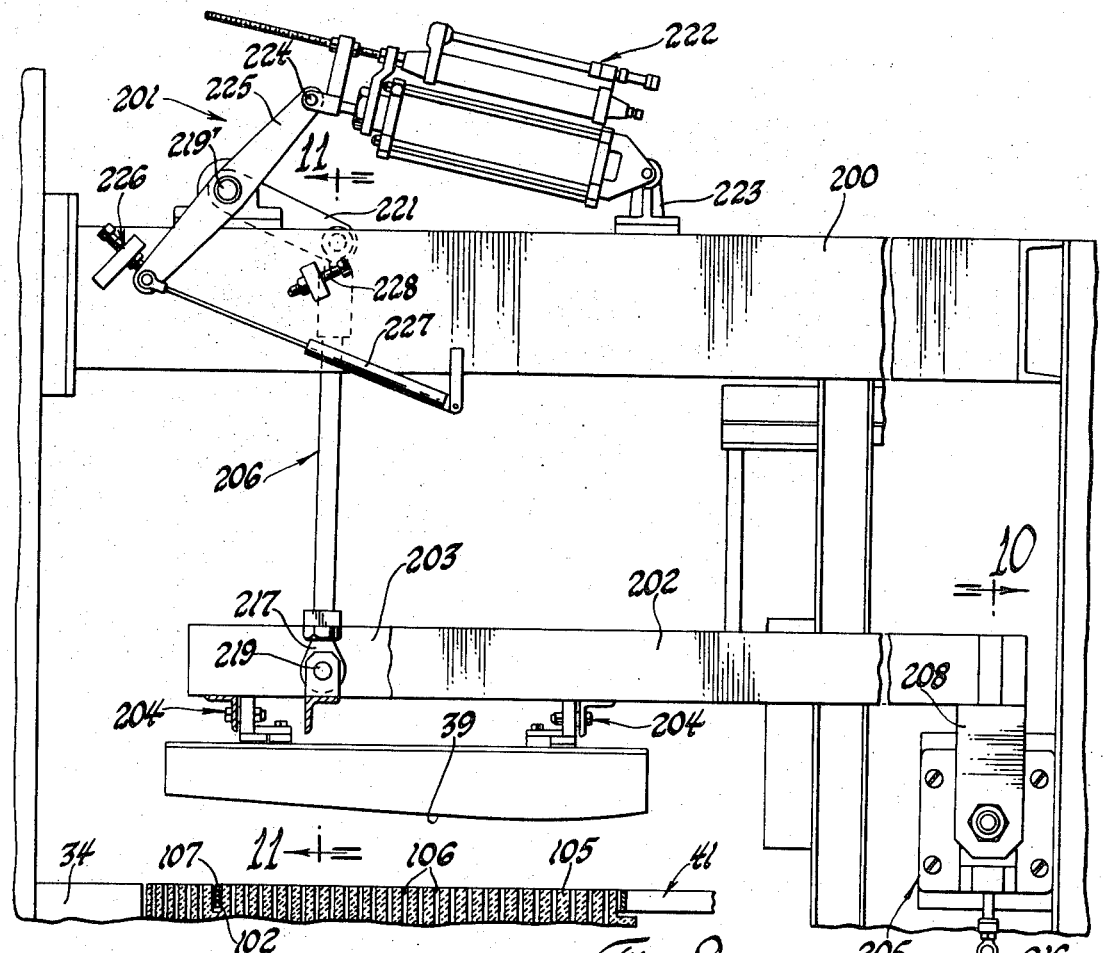
FIG. 9 is an enlarged fragmentary elevated view disclosing the bending station.
Figure 11:
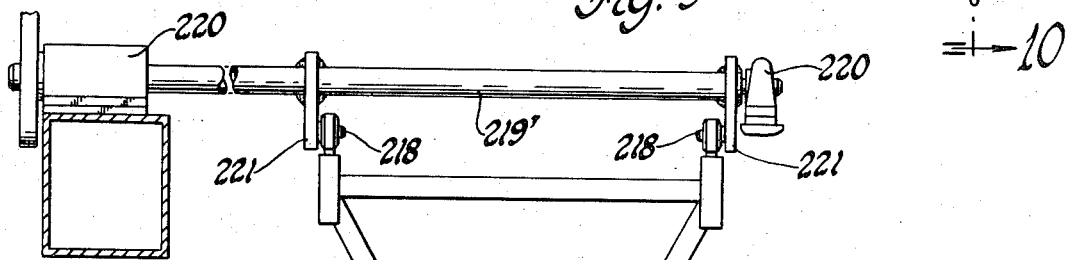
FIG. 11 is a cross sectional view taken substantially along line 11—11 of FIG. 9.

The third means 206 includes a triangular shaped member having one apex 217 operatively connected to the forming surface means 39 and the other two apexes 218 operatively connected to the support structure. At the apex 217 there is housed a spherical type bearing through which the shaft 219 may move horizontally to adjust the position of the forming surface means 39. Each apex 217 and 218 is supported through a spherical bearing type connection so that a swiveling movement is allowed at each apex connection. The lift means 201 is operatively connected to the apexes 218 of the triangular shaped member 206 for selectively raising the forming surface means 39. The lift means 201 includes a lift shaft 219' rotatably supported on the support structure through the bearing housings 220. There is also included a pair of lift arms 221 extending from the lift shaft 219' and operatively connected to the two apexes 218 respectively. There is also included means for selectively rotating the lift shaft 219' which comprises the fluid actuated cylinder-piston generally indicated at 222. The cylinder-piston 222 is supported on the support structure by the bracket 223 and has the piston thereof pivotally connected at 224 to a lever 225. The lever 225 is connected to the lift shaft 219' for rotating the latter. There is also included an adjustable stop means 226 disposed on the support structure to engage the lever 225 to limit movement of the lever 225 and for changing the vertical position of the forming surface means 39 when the latter is in the lowered position as illustrated in FIG. 9. In other words, when the mold surface 39 is in the lowered position illustrated in FIG. 9, the adjustment means 226 may be operated to rotate the shaft 219 which in turn adjusts the vertical position of the mold surface 39. There is also included a biasing means comprising the cylinder-piston arrangement 227 for reacting between the support structure and the lever 225 to urge the mold surface 39 to the lowered position as illustrated in FIG. 9. The cylinder-piston 227 may be fluid actuated or may be a shock absorber type device with a spring or other cushioning media disposed within the cylinder thereof. There is also included another stop means 228 for limiting vertical upward movement of the mold surface 39.

As is clear, therefore, the forming surface means 39 is connected to the support structure through an adjustment means which may be operated for universally adjusting the position of the forming surface means 39 as well as raising the forming surface means 39.

When a sheet of glass is pressed against a mold surface such as that illustrated at 39, the mold surface 39 must be in a very precise position for the proper alignment and coaction with the frame which is to press the sheet of glass thereagainst. The adjustment means disclosed herein for interconnecting the mold surface 39 and the support structure allows the mold surface 39 to be universally adjusted to the exact desired precise position. Furthermore, once the frame means 102 has moved a sheet of glass vertically upwardly and into pressing engagement with the forming surface 39, the cylinder-piston 222 is actuated to raise the forming surface 39 upwardly out of the way so that the first frame means 102 may move generally horizontally toward and into the blasthead.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An apparatus for treating sheets of material comprising; a blasthead for impinging fluid on a generally horizontally disposed sheet, sheet engaging means for engaging and controlling the position of a sheet in said blasthead, vertical retract means for selectively moving said sheet engaging means between a first position for engaging a sheet and a second position vertically spaced from said first position for allowing a sheet to move into and out of said blasthead without interference with said sheet engaging means and oscillating means operably engageable with said sheet engaging means for oscillating said sheet engaging means to oscillate a sheet engaged thereby while being impinged by said fluid in said blasthead.

2. An apparatus as set forth in claim 1 including frame means for removing a sheet from said sheet engaging means and out of said blasthead.

3. An apparatus as set forth in claim 2 including a conveyor adjacent said blasthead for removing a sheet from said frame means when the latter is moved out of said blasthead.

4. An apparatus as set forth in claim 1 including frame means for supporting and moving a sheet into said blasthead, and said oscillating means includes means operatively engaging said frame means when said frame means is in said blasthead for oscillating said frame means in unison with said sheet engaging means to allow a sheet to be transferred from said frame means to said sheet engaging means.

5. An apparatus as set forth in claim 1 wherein said blasthead includes vertically spaced upper and lower modules for impinging fluid against opposite sides of a sheet, said sheet engaging means includes a pair of arms extending toward one another and into the space between said modules, and means supported on said arms for engaging the edge of a sheet.

6. An apparatus as set forth in claim 5 including frame means normally recessed in said lower module for moving upward and out of said blasthead to remove a sheet from said means supported on said arms and to move the sheet out of said blasthead as said sheet engaging means is retracted.

7. An apparatus as set forth in claim 5 including a pair of said arms adjacent each side of said blasthead.

8. An apparatus as set forth in claim 7 including a sway bar extending along said blasthead adjacent each side thereof, spaced first and second depending members extending downwardly from each sway bar, said arms being respectively connected to extend in a cantilevered manner from the lower ends of said depending members.

9. An apparatus as set forth in claim 8 wherein said means on said arms for engaging a sheet comprises a fluid actuated cylinder-piston connected to the distal end of each arm, a pad for engaging and supporting a sheet being connected to each piston.

10. An apparatus as set forth in claim 8 including a pair of spaced pendulum links associated with each sway bar, said pendulum links being operatively connected to said blasthead adjacent the upper ends thereof for swinging movement relative thereto, said pendulum links being pivotally connected to one of said sway bars adjacent the lower ends thereof so that said sway bars are free to oscillate.

11. An apparatus as set forth in claim 10 wherein said vertical retract means includes a pair of spaced lift shafts rotatably supported by and extending between the sides of said blasthead, a lift arm connected to and extending from each lift shaft adjacent each end thereof, the distal end of each lift arm being pivotally connected to one of said pendulum links so that said pendulum links and said sway bars move vertically upon rotation of said lift shafts.

12. An apparatus as set forth in claim 8 wherein said oscillating means includes a cam follower member extending upwardly from each of said sway bars, an eccentric cam engaging each cam follower member so that said sway bars are oscillated upon rotation of said eccentric cams.

13. An apparatus as set forth in claim 12 including a drive shaft rotatably supported by said blasthead and extending thereacross, said eccentric cams being connected to said drive shaft so as to be rotated thereby, said eccentric cams being in phase to oscillate said sway bars in unison upon rotation of said drive shaft.

14. An apparatus as set forth in claim 13 including motor means operatively connected to said drive shaft for rotating said drive shaft whereby said sway bars are oscillated.

15. An apparatus as set forth in claim 14 including a pair of spaced pendulum links associated with each sway bar, said pendulum links being operatively connected to said blasthead adjacent the upper ends thereof for swinging movement relative thereto, said pendulum links being pivotally connected to one of said sway bars adjacent the lower ends thereof so that said sway bars are free to oscillate.

16. An apparatus as set forth in claim 15 wherein said vertical retract means includes a pair of spaced lift shafts rotatably supported by and extending between the sides of said blasthead, a lift arm conected to and extending from each lift shaft adjacent each end thereof, the distal end of each lift arm being pivotally connected to one of said pendulum links so that said pendulum links and said sway bars move vertically upon rotation of said lift shafts.

17. An apparatus as set forth in claim 16 including at least one drive arm connected to and extending from each lift shaft, a link pivotally connected at one end thereof to a drive arm connected to one lift shaft and pivotally connected at the other end thereof to a drive arm connected to the other lift shaft, and means for rotating one of said lift shafts.

18. An apparatus as set forth in claim 17 wherein said means for rotating one of said lift shafts comprises a lever connected to one of said lift shafts and a cylinder-piston disposed adjacent thereto with the piston being operatively connected to said lever so that said lift shafts are rotated upon movement of said piston.

19. An apparatus as set forth in claim 18 including frame means for supporting and moving a sheet into said blasthead, at least one offset cam member connected to said drive shaft for operatively engaging said frame means when said frame means is in said blasthead, said cam member being in phase with said eccentric cams for oscillating said frame means in unison with said sheet engaging means to allow a sheet to be transferred from said frame means to said sheet engaging means.

20. An apparatus as set forth in claim 19 wherein said means on said arms for engaging a sheet comprises a fluid actuated cylinder-piston connected to the distal end of each arm, a pad for engaging and supporting a sheet being conected to each piston.

21. An apparatus for treating sheets of glass comprising: a blasthead for impinging fluid on sheets, frame means for supporting and moving a sheet into said blasthead, and operating means for moving said frame means horizontally into said blasthead to move the sheet thereon into said blasthead, said operating means including vertical and horizontal guide means operatively interconnecting said blasthead and said frame means for allowing the latter to respectively move vertically and horizontally, horizontal drive means operatively connected to said horizontal guide means for moving said frame means horizontally and means interconnecting said horizontal guide means and said horizontal drive for allowing said horizontal guide means and said frame means to be oscillated independently of said horizontal drive means.

22. An apparatus for treating sheets of material comprising: a blasthead for impinging fluid on a sheet, moving means for engaging and moving a sheet into said blasthead, sheet engaging means for receiving a sheet from said moving means and engaging same to control the position of the sheet in said blasthead, and oscillation means operable upon said moving means and said sheet engaging means for oscillating said sheet engaging means and said moving means in unison in said blasthead as said sheet engaging means receives a sheet from said moving means.

References Cited

UNITED STATES PATENTS

| | | | |
|---|---|---|---|
| 1,970,730 | 8/1934 | Black | 65—349 |
| 2,131,406 | 9/1938 | Mosmieri et al. | 65—349 |

ARTHUR D. KELLOGG, Primary Examiner

U.S. Cl. X.R.

65—351